(12) United States Patent
Aoyama et al.

(10) Patent No.: US 8,391,840 B2
(45) Date of Patent: Mar. 5, 2013

(54) RADIO COMMUNICATION BASE STATION DEVICE AND CALL CONNECTION METHOD

(75) Inventors: Takahisa Aoyama, Kanagawa (JP); Akito Fukui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1193 days.

(21) Appl. No.: 12/159,377

(22) PCT Filed: Dec. 26, 2006

(86) PCT No.: PCT/JP2006/325964
§ 371 (c)(1),
(2), (4) Date: Jun. 26, 2008

(87) PCT Pub. No.: WO2007/077840
PCT Pub. Date: Jul. 12, 2007

(65) Prior Publication Data
US 2010/0222023 A1 Sep. 2, 2010

(30) Foreign Application Priority Data

Dec. 28, 2005 (JP) ................................ 2005-379336
Mar. 31, 2006 (JP) ................................ 2006-100831
Dec. 22, 2006 (JP) ................................ 2006-346598

(51) Int. Cl.
*H04M 1/66* (2006.01)
(52) U.S. Cl. ........ 455/411; 455/436; 455/439; 455/442; 455/432.1; 370/331
(58) Field of Classification Search ................. 455/411, 455/436, 439, 442, 432.1; 370/331
See application file for complete search history.

(56) References Cited

U.S. PATENT DOCUMENTS

| 5,329,573 | A | 7/1994 | Chang | |
|---|---|---|---|---|
| 6,223,035 | B1* | 4/2001 | Pierce et al. | 455/433 |
| 7,421,506 | B2* | 9/2008 | Ni et al. | 709/230 |
| 7,756,082 | B1* | 7/2010 | Dhamdhere | 370/331 |
| 2002/0049913 | A1 | 4/2002 | Lasky | |
| 2003/0157923 | A1 | 8/2003 | Tani | |
| 2005/0237969 | A1* | 10/2005 | Jung et al. | 370/328 |
| 2008/0072046 | A1* | 3/2008 | Ayaki et al. | 713/171 |
| 2010/0138651 | A1* | 6/2010 | Wang et al. | 713/155 |

FOREIGN PATENT DOCUMENTS

| JP | 6-069880 | 3/1994 |
|---|---|---|
| JP | 7-203540 | 8/1995 |
| JP | 2002-539716 | 11/2002 |
| JP | 2003-244284 | 8/2003 |

* cited by examiner

OTHER PUBLICATIONS

International Search Report dated May 1, 2007.

*Primary Examiner* — Nimesh Patel
(74) *Attorney, Agent, or Firm* — Seed IP Law Group PLLC

(57) ABSTRACT

Disclosed are a base station device and a call connection method for reducing a call connection delay. According to the device and the method; in ST301, a terminal acquires an identifier managed in a base station (100); in ST302, radio resource information required for a service desired by the terminal is decided; in ST303, by using the identifier acquired in ST301, the terminal transmits a request for establishing RRC connection to the base station (100). In ST304, according to the radio resource information received from the terminal, the base station (100) decides the radio resource to be set for the terminal before authentication by an upper layer node, and the base station (100) extracts information destined to the upper layer node. In ST305, the information destined to the upper layer node is transmitted to the upper layer node. In ST306, the setting contents of the radio resource decided in ST304 are transmitted to the terminal.

8 Claims, 30 Drawing Sheets

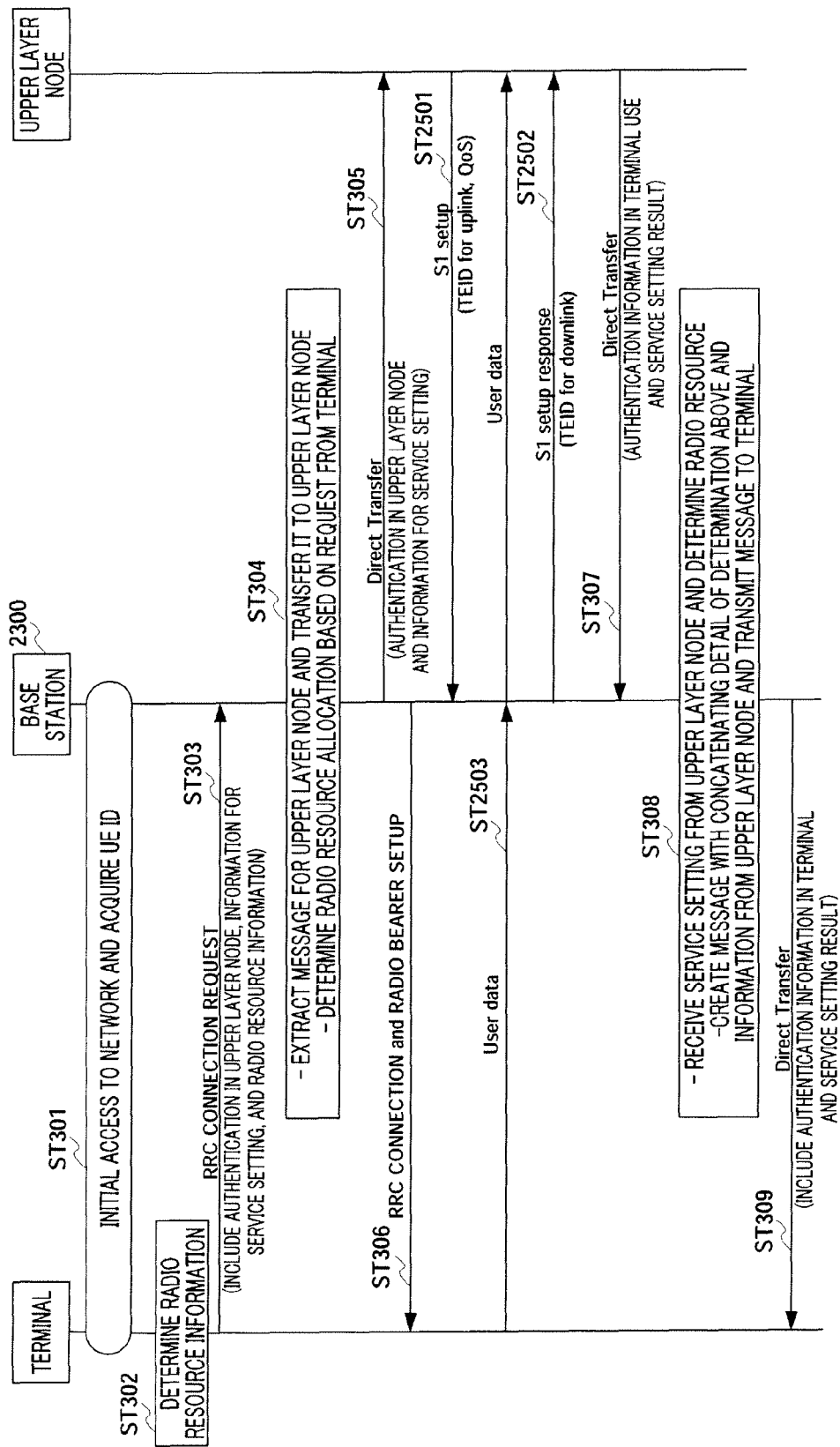

RADIO COMMUNICATION BASE STATION DEVICE AND CALL CONNECTION METHOD

TECHNICAL FIELD

The present invention relates to a radio communication base station apparatus and a call connection method.

BACKGROUND ART

One of the main targets of LTE (Long Term Evolution) and SAE (System Architecture Evolution) is to reduce call connection delay. A call connection includes two main components of RRC (Radio Resource Control) establishment and call control. For that reason, the point of call connection lies in how efficiently the operations of these two components are carried out. Here, RRC constitutes the core in radio control and has the functions of including mobility control of a terminal (e.g. a command to transfer a base station in connection). Moreover, a call connection is performed in an upper layer node and includes authentication and checking what call is established.

FIG. 1 shows an overview of call connection steps in the conventional (UMTS) scheme. Referring to this figure, in step (hereinafter abbreviated as "ST") 11, the terminal determines power for transmitting an RRC message to the base station/radio control node and performs layer 1 processing to secure resources for message transmission use. Determination of transmission power is to optimize the power transmitted by a terminal, and the terminal starts transmission to the base station with an initial value determined from received quality of report information and gradually increases power until the terminal receives a response from the base station. The power upon receiving a response from the base station/radio control node or a power with an addition of offset to that power is the power for transmitting an RRC message. Resources for transmission use are secured so as to prevent a plurality of terminals from using the same resources at the same time.

In ST12, based on the power and the resources for transmission use determined in ST11, the terminal transmits an RRC connection establishment request to the base station/radio control node. This request information includes, for example, an identifier for identifying the terminal and the reason for the RRC connection establishment request. The terminal accepts the request and transmits a message to command setup of an RRC connection. This message includes the identifier of the terminal for managing the terminal in the base station/radio control node, and radio resources and channel setup for transmitting the RRC message. After this, the terminal establishes an RRC connection (i.e. a channel setup) and, after the establishment is finished, transmits a response message using the channel that is set up.

In ST13, message transmission and reception are performed mainly between the terminal and the upper layer node. These transmission and reception are performed by including a message for the upper layer node in the RRC message. The details setting up here are the level setting for a service to be provided, mutual authentication between the terminal and the upper layer node and security (encryption and securing confidentiality) settings. Setting up encrypted keys and secret keys is also carried out from the upper layer node to the base station here.

In ST14, in accordance with the service level determined in ST13, the channel setting for actual data transmission and reception, is performed. This includes radio setup between the base station/the radio control node and the terminal and the network resource setup between the upper layer node and the base station/the radio control node. Data communication is started after this.

The call connection steps shown in FIG. 1, for ease of description, "service notification, authentication and security setup" and "channel setup for data transmission and reception" are described completely in serial order, but, considering the response messages, the actual call connection steps are partly entwined. Nevertheless, this is not an essential problem, and the concept is that "channel setting for data transmission and reception" is carried out after "a service notification, an authentication and security setup". Moreover, the base station and the base control node have been explained as an integrated entity, but they are actually separated as two apparatuses.

In this way, in the call connection steps shown in FIG. 1, respective processing (ramping process in layer 1, RRC connection setup, service notification, authentication and security setup, channel setting for data transmission and reception, etc.) are performed in serial. This makes a call connection time-consuming. Moreover, a channel setup is performed twice in the RRC connection setup and the channel setup for data transmission and reception (see Non-patent Document 1 and Non-patent Document 2). For this reason, the radio channel (layer 1) needs to be set up more than once, which is inefficient.

Then, to solve the above problem, another method of call connection is currently proposed by 3GPP, and the steps of this call connection method are shown in FIG. 2. Referring to FIG. 2, in ST21, the terminal acquires an identifier managed in the base station. This may be layer 3 processing or this may be layer 2 or layer 1 processing.

In ST22, the terminal transmits an RRC connection establishment request to the base station using the identifier acquired in ST21. This is different from the conventional (UMTS) scheme in that this RRC connection establishment request includes "an authentication in the upper layer node and information for a service setup (applicable to a service notification, an authentication and security setting in UMTS)."

In ST23, the base station extracts information for the upper layer node, and in ST24, transmits the extracted information to the upper layer node. Moreover, at the same time, the base station prepares for an RRC connection establishment.

Based on the information "the authentication in the upper layer node and the information for a service setup (applicable to the service notification, the authentication and security setting in UMTS)" transmitted from the base station, the upper layer node authenticates the terminal, determines the service level and makes a preparation for security. Then, in ST25, the upper layer node transmits a response message to the base station.

In ST26, based on the message received by the base station, the base station determines the radio channel for data transmission between the base station and the terminal. Then, the base station creates an RRC message, which sets up an RRC connection and a radio channel for data use, and embeds a message transmitted from the upper layer node into the RRC message, and, in ST27, transmits the message to the terminal.

The terminal sets up the RRC connection and the radio for data use, based on the message received from the base node. Moreover, the terminal sets up security, authenticates the network, and sets up the service level. Communication is started after this.

In this way, in the call connection steps shown in FIG. 2, messages for the base station and the upper layer node are concatenated and transmitted from the terminal. Moreover, a message from the base station is transmitted after the base station waits for a message from the upper layer node.

Non-patent Document 1: 3GPP TR25.331, "Radio Resource Control (RRC) Protocol Specification"

Non-patent Document 2: 3GPP TR24.008, "Mobile radio interface Layer 3 specification; Core network protocols; Stage3"

DISCLOSURE OF INVENTION

Problems to be Solved by the Invention

However, with the call connection steps proposed in 3 GPP, it takes time for an RRC connection establishment. The reason is that a message for RRC connection setup is transmitted after waiting for a response from the upper layer node (CN). By this means, to be more specific, the timing of establishing an RRC connection delays, and so, mobility control cannot be performed until then. That is, it is likely that a terminal moves to other cells before an RRC connection is established, and, in that case, various processes including the steps of processing RRC connection establishment again, would be required. Moreover, upon focusing on RRC connection establishment delay, degradation of performance occurs in the call connection steps more than in UMTS.

Furthermore, when a message for an RRC connection set up and a message for a NAS set up are processed at the same time, the time required for setting the radio channel (layer 1) including an RRC connection setup is dominant, which is one factor that makes the setting time after receiving an RRC message and a NAS message longer than a case where the NAS message alone is received.

It is therefore an object of the present invention to provide a radio communication base station apparatus and a call connection method for reducing call connection delay.

Means for Solving the Problem

The radio communication base station apparatus of the present invention adopts a configuration including: a receiving section that receives a call establishment request transmitted from a radio communication terminal apparatus; and a radio control section that performs a radio connection to the radio communication terminal apparatus before an authentication by an upper layer node apparatus based on the call establishment request, and starts assigning a data channel to the radio communication terminal apparatus after the authentication.

The call connection method of the present invention includes: performing a radio connection to a radio communication terminal apparatus before an authentication by an upper layer node apparatus based on a call establishment request, and starting assigning a data channel to the radio communication terminal apparatus after the authentication.

Advantageous Effect of the Invention

According to the present invention, call connection delay can be reduced.

BRIEF DESCRIPTION OF DRAWINGS

FIG. 30 illustrates a sequence diagram showing the other operations of the network according to Embodiment 8 of the present invention.

BEST MODE FOR CARRYING OUT THE INVENTION

Figure 1:
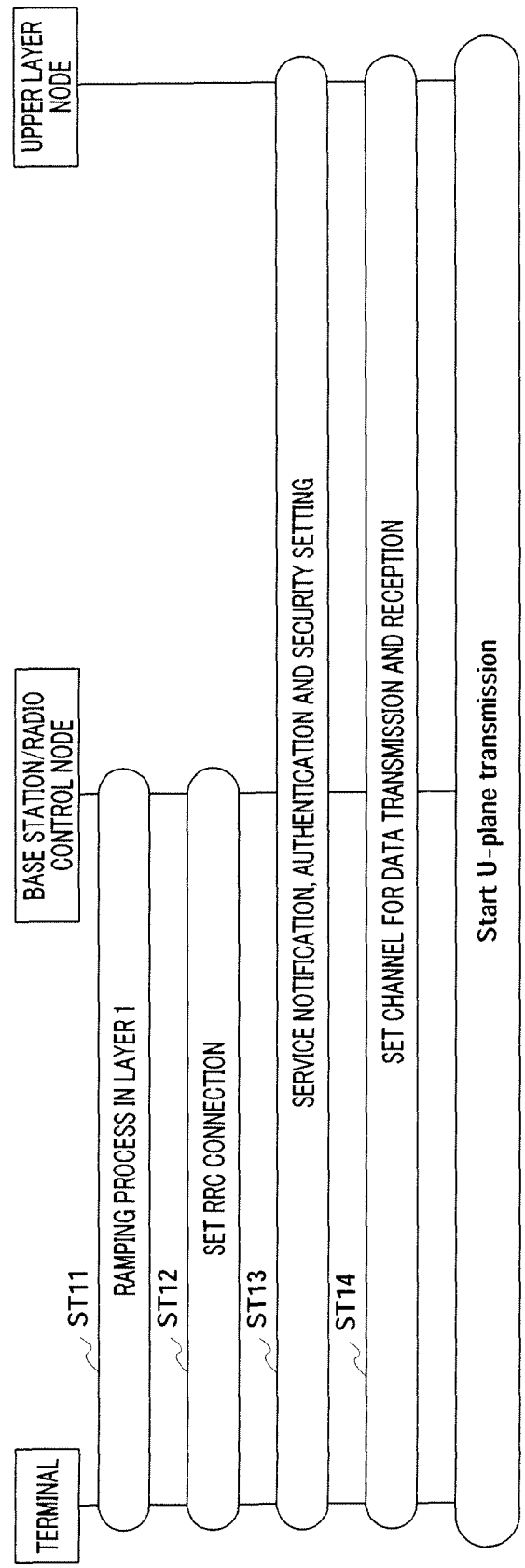
FIG. 1 illustrates a sequence diagram showing an overview of call connection steps in the conventional (UMTS) scheme.
Figure 2:
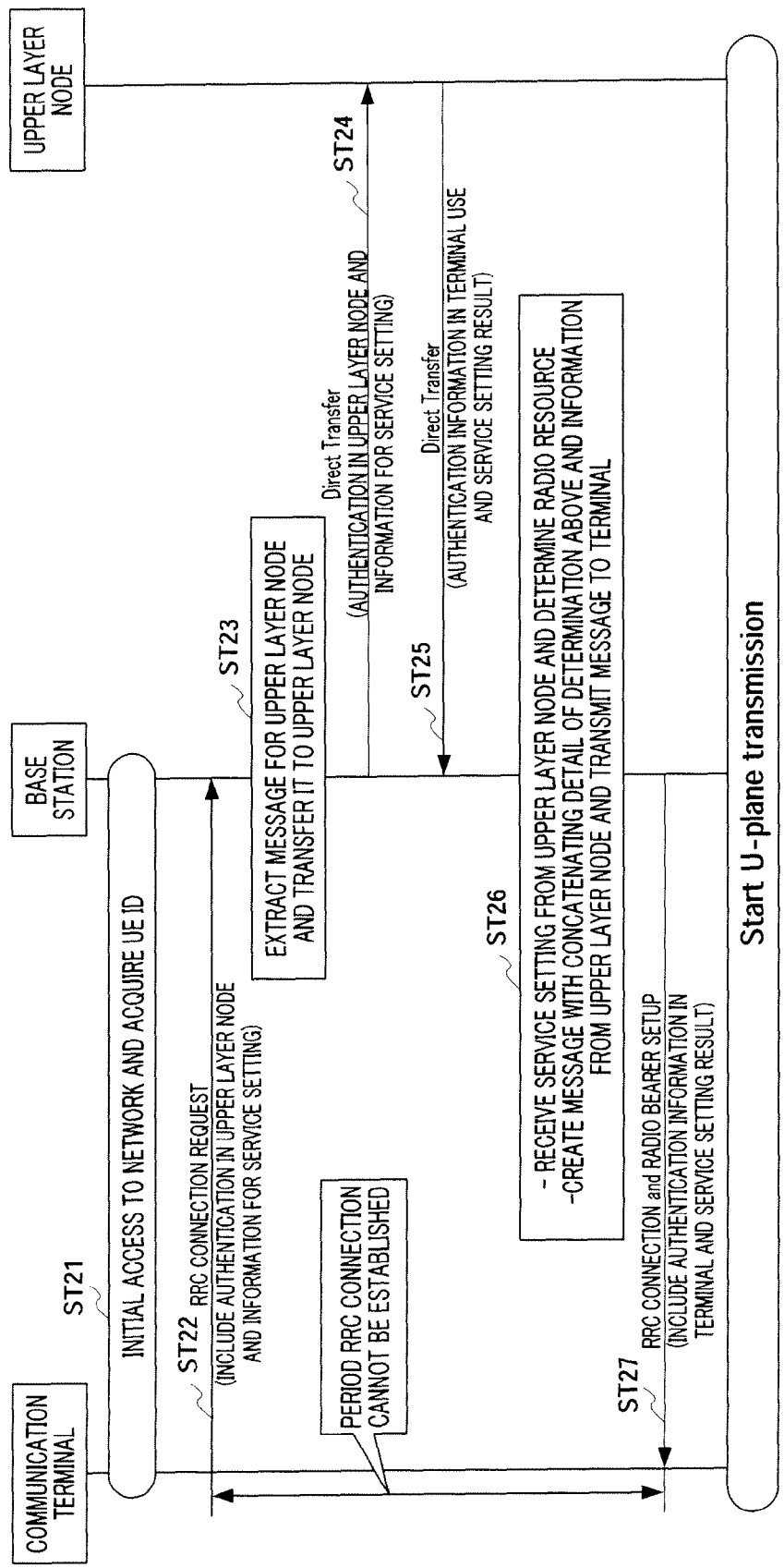
FIG. 2 illustrates a sequence diagram showing the call connection steps proposed in 3GPP.

Now, embodiments of the present invention will be described in detail with reference to the accompanying drawings. In the embodiments, the components having the same functions will be assigned the same reference numerals and overlapping descriptions will be omitted.

A case will be explained with the following embodiment where the base station has radio control functions and a station that exists as its upper layer node has functions for authentication and deciding service levels. However, the present invention is not limited to this, and an upper layer node of the base station may have radio control functions, or the stations that perform radio control, authentication or service level decision may be the same station.

Embodiment 1

Figure 3:
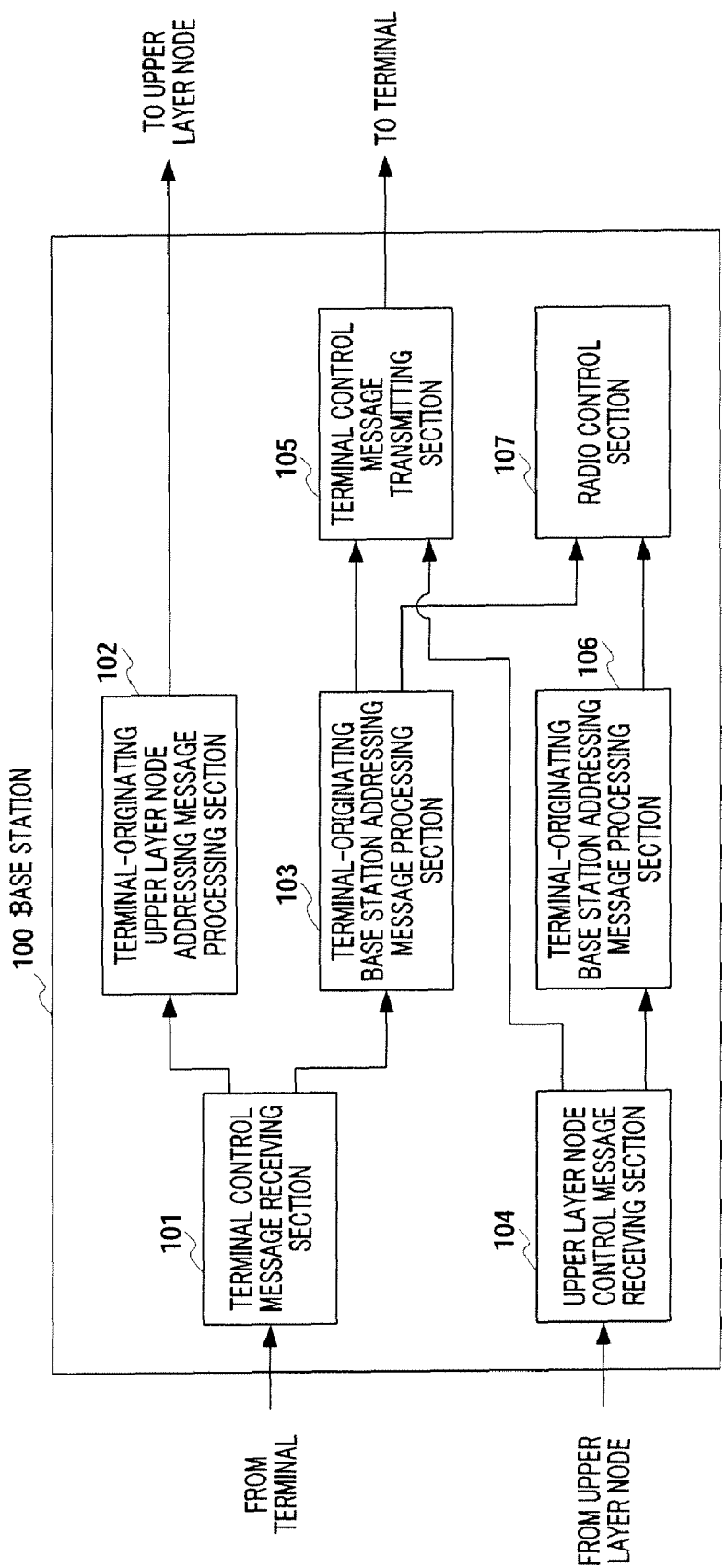
FIG. 3 is a block diagram showing the configuration of the base station apparatus according to Embodiments 1, 4 and 5 of the present invention.

FIG. 3 is a block diagram showing the configuration of base station apparatus 100 according to Embodiment 1 of the present invention. Referring to this figure, terminal control message receiving section 101 receives messages (for example, messages such as RRC messages and NAS messages, which correspond to layer 3) transmitted from a communication terminal apparatus (hereinafter a "terminal"), and divides the messages into the messages to be processed in the base station apparatus (hereinafter a "base station") and the messages to be processed in the upper layer node. Terminal control message receiving section 101 outputs the messages to be processed in the upper layer node to terminal-originating upper layer node addressing message processing section 102 and outputs the messages to be processed in base station 100 to terminal-originating base station addressing message processing section 103. However, if messages for the upper layer node are transmitted apart from RRC messages, terminal control message receiving section 101 has only to perform sorting processing. If messages for the upper layer node are embedded in RRC messages as in UMTS, processing for extracting these messages for the upper layer node is necessary.

Terminal-originating upper layer node addressing message processing section 102, upon acquiring a message outputted from terminal control message receiving section 101, executes protocol processing for transmitting messages correctly to the upper layer node managing the terminal that transmitted the message. Then, terminal-originating upper layer node addressing message processing section 102 adds a header including an address and so on to the message, and transmits this message to the upper layer node. The protocol used then is not particularly limited.

Terminal-originating base station addressing message processing section 103 acquires a radio control message, out of messages outputted from terminal control message receiving section 101, and determines setting up a radio channel according to the radio channel setup request included in the acquired radio control message. Terminal-originating base station addressing message processing section 103 determines setting up a radio channel without receiving authentication by the upper layer node. The details of setup determined with respect to the radio channel are outputted to radio control section 107, and, meanwhile, a response message is outputted to terminal control message transmitting section 105.

Upper layer node control message receiving section 104 receives control messages (e.g. messages such as NAS messages, which correspond to layer 3) transmitted from upper layer nodes, outputs the messages to be processed in base station 100, amongst the received messages, to upper layer node-originating base station addressing message processing section 106, and outputs the messages to be transmitted to the terminal to terminal control message transmitting section 105. When a message is processed in base station 100 and is also transmitted to the terminal, it is possible to duplicate the message, and output one to upper layer node-originating base station addressing message processing section 106 and the other to terminal control message transmitting section 105.

Terminal control message transmitting section 105 executes protocol processing of the response message outputted from terminal-originating base station addressing message processing section 103 and the message for the terminal outputted from upper layer node control message receiving section 104, and transmits the messages after the protocol processing, to the terminal.

Upper layer node-originating base station addressing message processing section 106 acquires the message outputted from upper layer node control message receiving section 104, and, based on the acquired message, determines the control to perform in base station 100. That is, upper layer node-originating base station addressing message processing section 106 determines, for example, whether or not to actually allow communication to the terminal and what service levels of communication to allow. The details determined are outputted to radio control section 107.

According to the details of radio channel setup outputted from terminal-originating base station addressing message processing section 103, radio control section 107 performs radio control prior to the authentication in the upper layer node, and establishes a channel. Moreover, scheduling is performed based on the communication authorization and service level information for the terminal outputted from upper layer node-originating base station addressing message processing section 106. The scheduling is performed after the authentication in the upper layer node.

Figure 4:
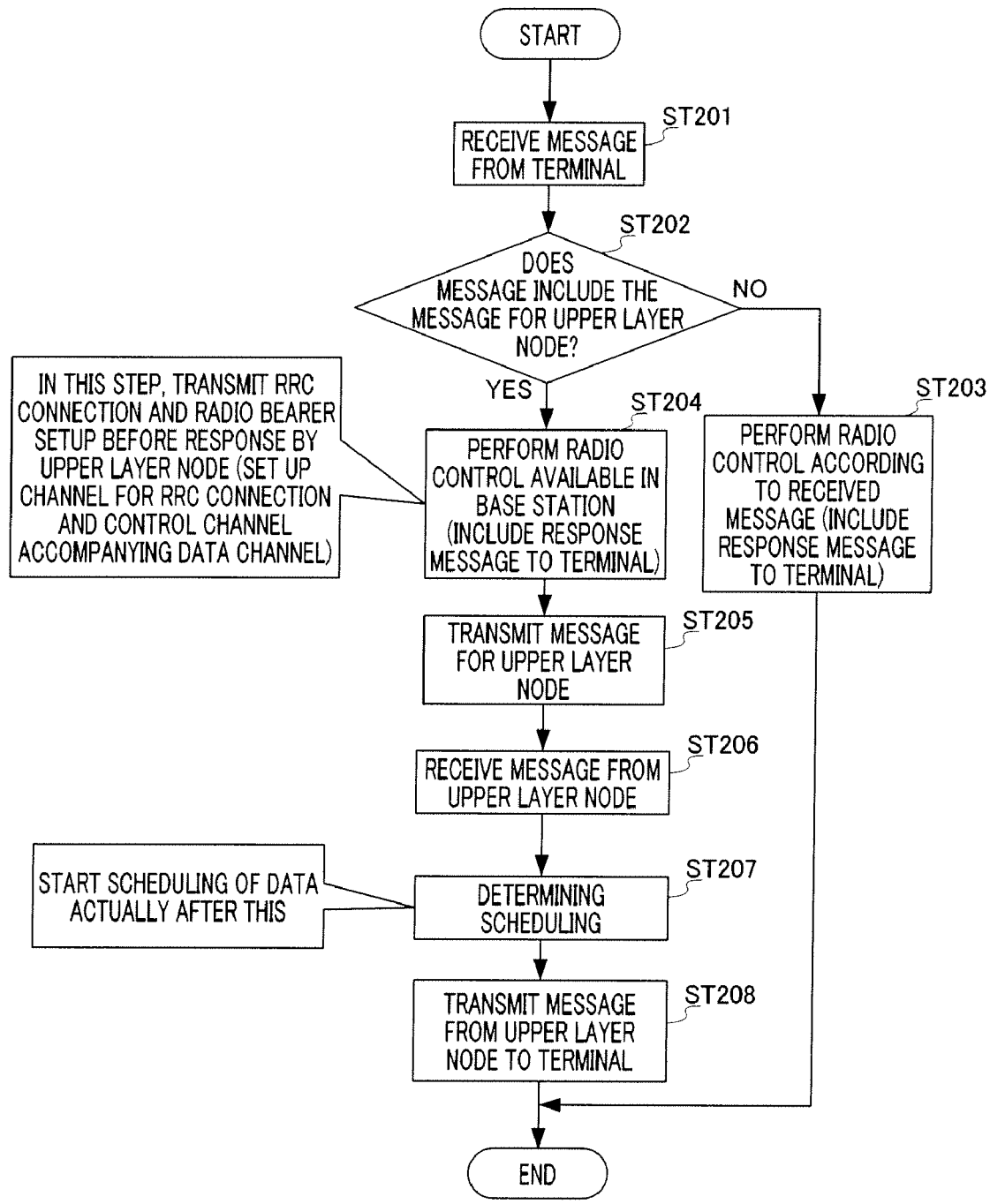
FIG. 4 is a flowchart showing the operations of the base station apparatus shown in FIG. 3.

Next, the operations of base station 100 above will be explained using FIG. 4. In FIG. 4, in ST201, messages transmitted from the terminal are received in terminal control message receiving section 101, and, in ST202, whether or not the messages received in terminal control message receiving section 101 include messages for the upper layer node is determined. When messages for the upper layer node are included, the step moves to ST204. When messages for the upper layer node are not included, that is, when there are only messages for the base station, the step moves to ST203.

In ST203, according to the received messages, terminal-originating base station addressing message processing section 103 determines the radio control setting and radio control section 107 performs radio control according to the determined details of setting, terminal control message transmitting section 105 transmits a response message to the terminal, and the processing is finished.

In ST204, before the upper layer node issues an authentication and determines the details of services, terminal-originating base station addressing message processing section 103 establishes an RRC connection and establishes a control channel accompanying a data channel (Associated PhyCH), which can be processed in base station 100. Moreover, messages commanding establishing an RRC connection, commanding establishing a control channel accompanying a data channel and representing information of data channel themselves, are transmitted to the terminal as response messages.

In ST205, terminal-originating upper layer node addressing message processing section 102 transmits the messages for the upper layer node, out of the messages transmitted from the terminal. This processing may be performed at the same time as ST204, and, when a message for the upper layer node is transmitted, other information may be added to this message and transmitted.

In ST206, control messages transmitted from the upper layer node are received in upper layer node control message receiving section 104, and, in ST207, scheduling assigning a data channel to the terminal is set up in addition to the radio control performed by radio control section 107 in ST203 and in ST204, based on the received messages for the upper layer node (an authentication issued by the upper layer node and determination of the service details) in ST206.

In ST208, terminal control message transmitting section 105 transmits a message transmitted from the upper layer node to the terminal. In this processing, the message from the upper layer node is not only transmitted as is. Instead, this message may be included in a radio control message and transmitted or where this message is added different information and transmitted.

Figure 5:
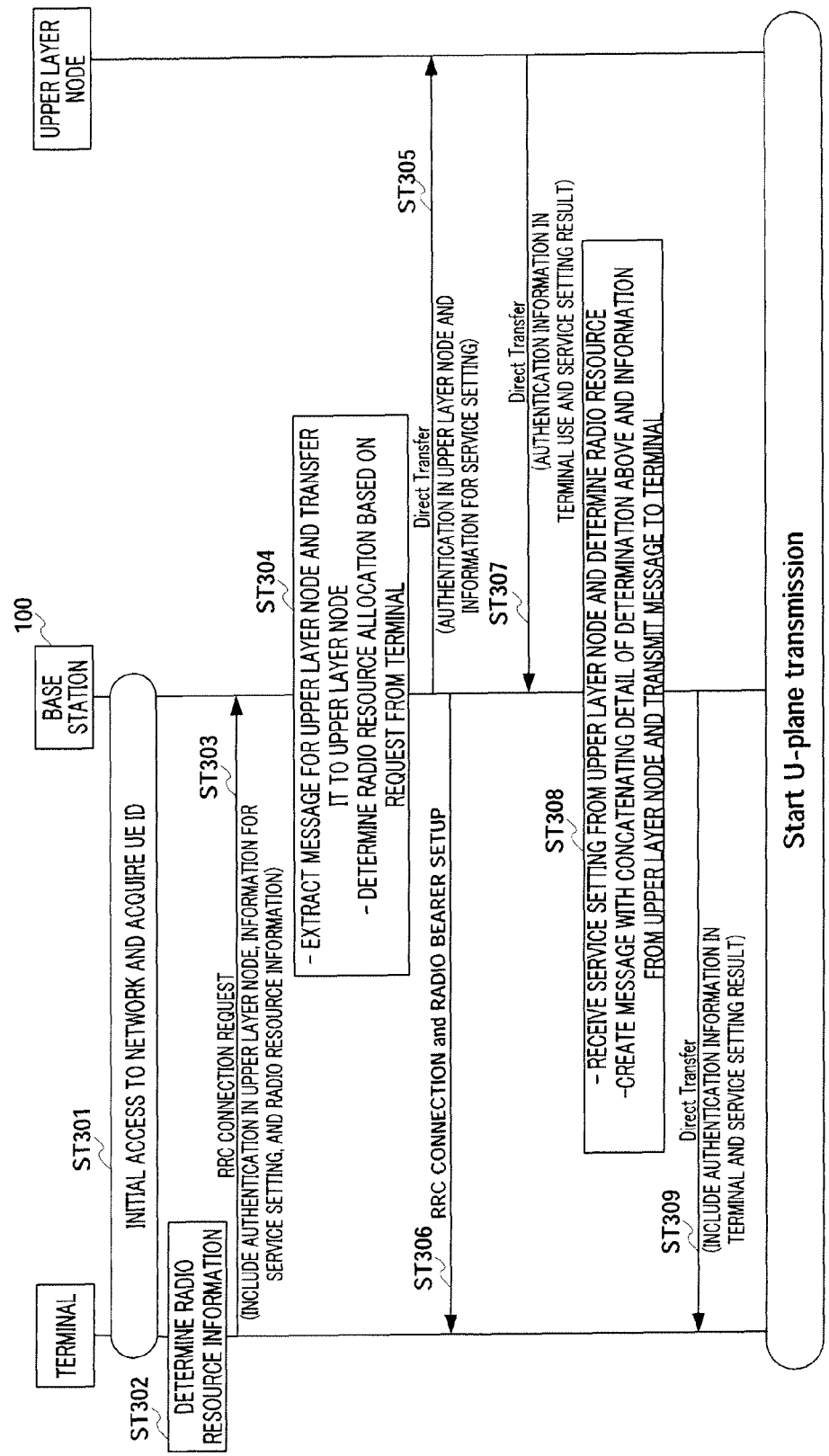
FIG. 5 illustrates a sequence diagram showing the operations of the network according to Embodiment 1 of the present invention.

FIG. 5 is a sequence diagram showing the operations of the network according to Embodiment 1 of the present invention. In this figure, in ST301, the terminal acquires an identifier managed in base station 100. This may be layer 3 processing or this may be layer 2 or layer 1 processing.

In ST302, radio resource information required for the service desired by the terminal is determined, and, in ST303, the terminal transmits a RRC connection establishment request to base station 100 using the identifier acquired in ST301. This RRC connection establishment request includes the authentication in the upper layer node, the information for a service setup, and the radio resource information determined in ST302.

In ST304, based on the radio resource information transmitted from base station 100 and desired by the terminal, base station 100 determines the radio resources to set for the terminal before acquiring the authentication from the upper layer node and meanwhile extracts information for the upper layer node. In ST305, base station 100 transmits the information for the upper layer node to the upper layer node, and, meanwhile, in ST306, includes the details of radio resource setting setup determined in ST304 in the RRC CONNECTION and RADIO BEARER SETUP message (hereinafter abbreviated as "RRC CONNECTION and RADIO BEARER SETUP"), and transmits these messages to the terminal.

Based on the authentication in the upper layer node and the information for service setup transmitted from base station 100, the upper layer node performs the authentication of the terminal, decides the service level and prepares for security. Then, in ST307, the upper layer node transmits a response message to base station 100.

In ST308, based on the message received by base station 100, the service level for data transmission between base station 100 and the terminal is checked. Then, scheduling is started using the associated channel for the data channel set up in ST304 and ST306. Moreover, in ST309, the messages sent from the upper layer node are transmitted to the terminal.

The terminal sets up the radio for the RRC connection and data, based on the message received from base station 100. Moreover, the terminal performs security setup, network authentication, service level setup and so on. Communication is started after this.

In this way, according to Embodiment 1, the base station establishes an RRC connection and an associated channel for transmitting and receiving the data channel, between the base station and the terminal, before the base station is authenticated by the upper layer node and acquires the service level and sets scheduling for assigning the data channel to terminals, so that, after the base station receives the authentication and the service level decision from the upper layer node, the base station is able to reduce call connection delay.

A case has been explained above with the present embodiment to presume a message for an upper layer node is included in a message for a base station. That is, a case has been explained above where a NAS message is included in an RRC message in UMTS. However, a case is also possible where a NAS message is not transmitted via an RRC message. To be more specific, a case is possible where a NAS message is processed as normal user data. The present embodiment is applicable to even such a case. This case will be explained using FIG. 6.

Figure 6:
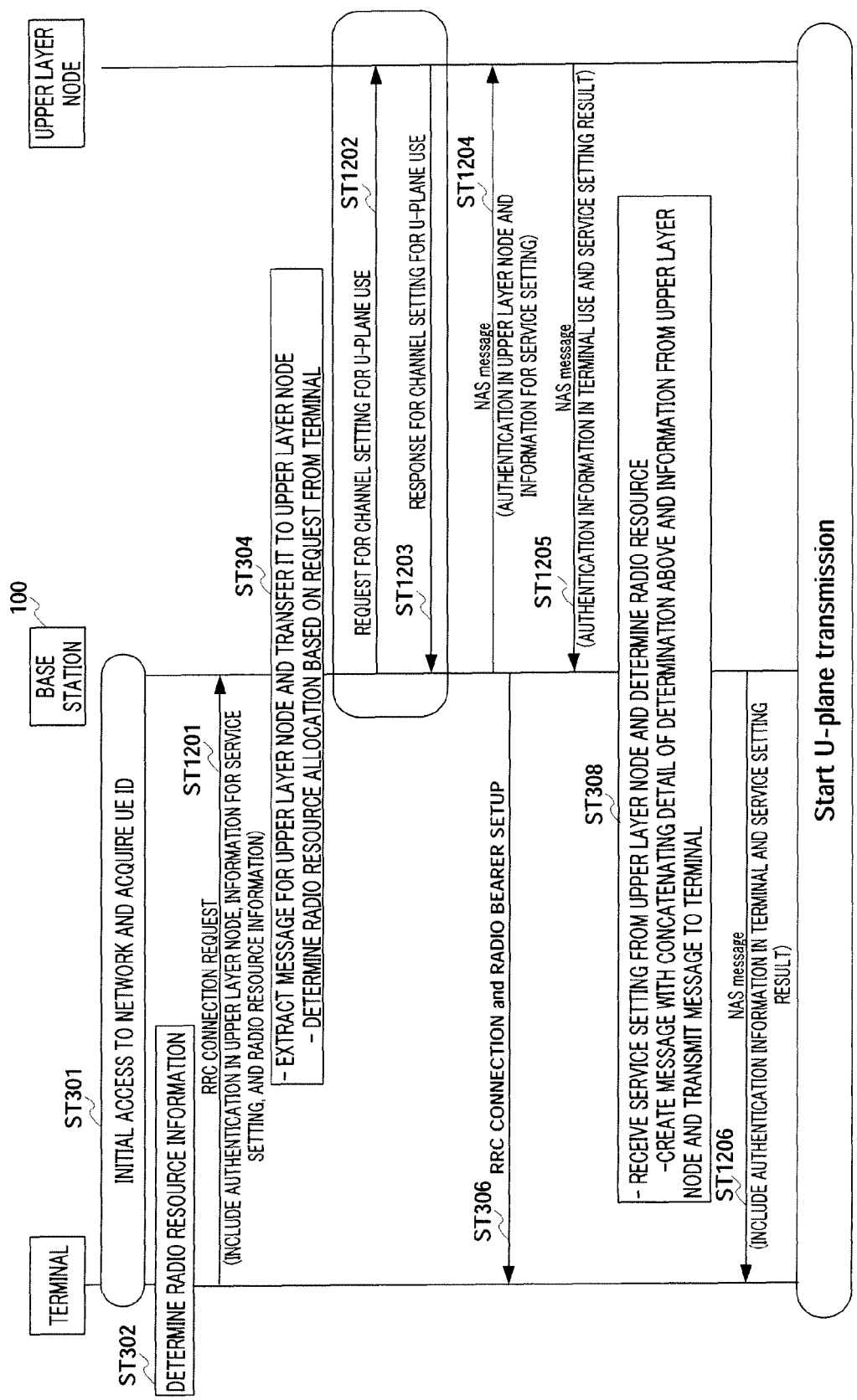
FIG. 6 illustrates a sequence diagram showing the operations of the network according to Embodiment 1 of the present invention.

In FIG. 6, in ST1201, an RRC connection request message (hereinafter abbreviated as "RRC CONNECTION REQUEST") transmitted from the terminal to base station 100 includes both a message for the upper layer node and a message for the base station. Here, the message for the upper layer node can be separated from the message for the base station in the lower layer. This lower layer is layer 2, and corresponds to MAC or RLC in UMTS. In the lower layer, the message for the base station (i.e, RRC message) is transmitted to the RRC and the message for the upper layer node is transmitted to the upper layer node.

In the message for the upper layer, the setup for transmission between base station 100 and the upper layer node is not yet fixed in this stage, and so, in ST1202, base station 100 transmits a channel setup request for U-plane use to the upper layer node, and, in ST1203, transmits a channel setup response for U-plane use to base station 100 in response. By this means, the setup between base station 100 and the upper layer node is performed. Further, if U-plane transmission is possible without setup between base station 100 and the upper layer node, this setup can be omitted.

Next, in ST1204, base station 100 transmits an upper layer node message to the upper layer node. This way of transmission in this case involves the same operations as for normal user data. The upper layer node processes this message and returns a response in ST1205.

Base station 100 receives the response from the upper layer node, and, in ST1206, transmits a message to the terminal. This transmission involves the same processing as for normal U-plane.

Although with the present embodiment focus is placed upon the processing of the terminal and the network and the processing between the base station and the upper layer node is not described in detail, it is possible to add more setup processing from the upper layer node to the base station and from the base station to the upper layer node. To be more specific, until a NAS message transmitted in ST1205, it is possible that the upper layer node controls the base station.

Although an explanation has been given above with the present embodiment where channel setting for U-plane use is necessary first between the base station and the upper layer node when a NAS message is processed as normal user data, the channel setup between the base station and the upper layer node may be carried out in synchronization with actual data transmission and reception. That is, it is possible that the operation of ST1202 is included into ST1204 and the operation of ST1203 is included into ST1205. Moreover, if a connection already exists between the base station and the upper layer node in advance, a new channel setup is not necessary. In this case, the operations of ST1202 and ST1203 are omitted.

Embodiment 2

Figure 7:
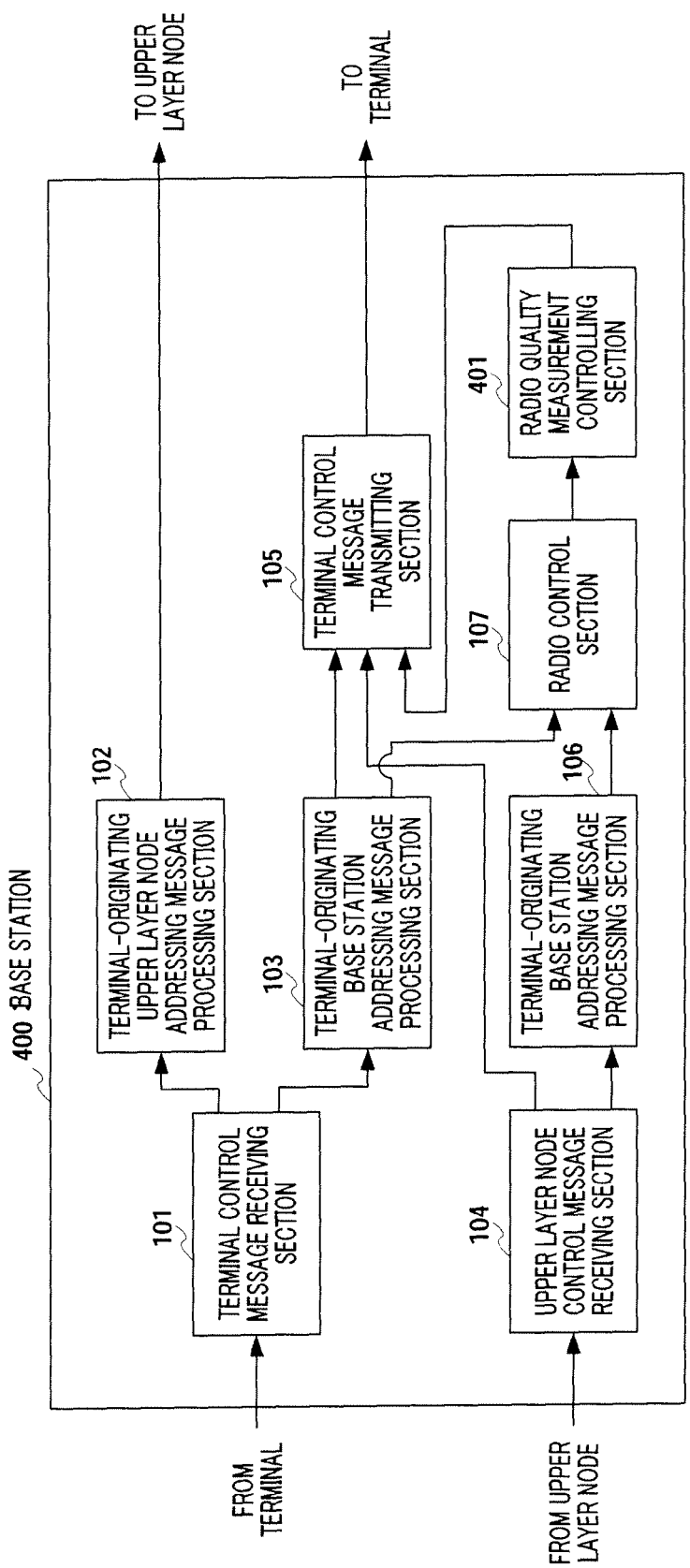
FIG. 7 is a block diagram showing the configuration of the base station apparatus according to Embodiment 2 of the present invention.

FIG. 7 is a block diagram showing the configuration of base station 400 according to Embodiment 2 of the present invention. Referring to this figure, radio quality measurement controlling section 401 stores cell information and so on, and, upon receiving an RRC connection establishment notice from radio control section 107, controls the terminal to measure radio quality. To be more specific, radio quality measurement controlling section 401 notifies to the terminal which cells are measured, how the cells are measured (for example, bands and cycles) and how to report. That is, radio quality measurement controlling section 401 transmits control information for controlling this terminal, to terminal control message transmitting section 105.

Figure 8:
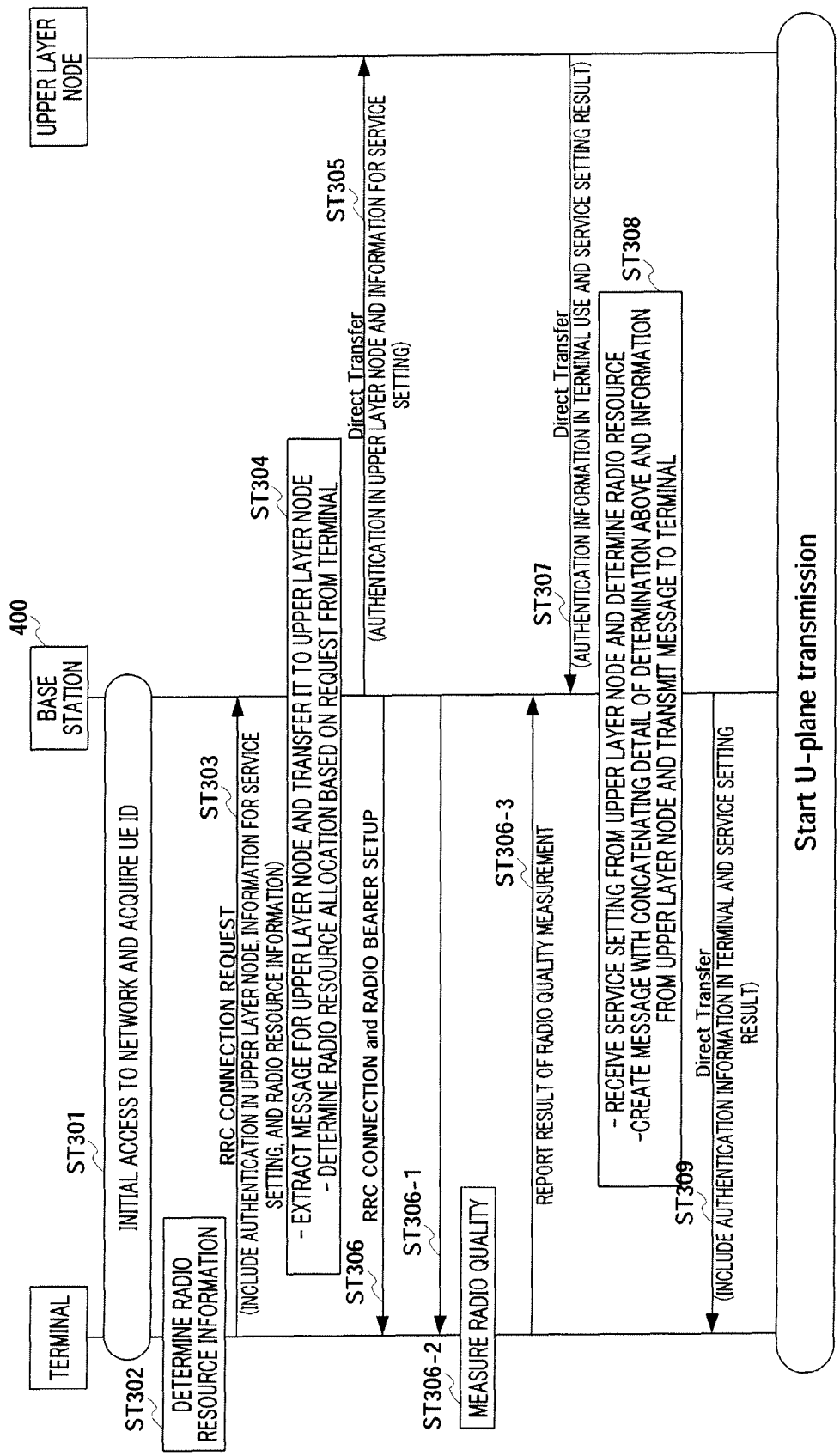
FIG. 8 illustrates a sequence diagram showing the operations of the network according to Embodiment 2 of the present invention.

FIG. 8 is a sequence diagram showing the operations of the network according to Embodiment 2 of the present invention. Further, in FIG. 8, the same reference numerals are assigned to the same parts as in FIG. 5, and description thereof in detail is omitted. Referring to FIG. 8, in ST306-1, the command of radio quality measurement for other cells as the measurement control is issued from base station 400 to the terminal, and, in ST306-2, according to the command from the base station 400, the terminal measures radio quality.

In ST306-3, by reporting the radio quality measured in ST306-2 to base station 400, based on radio quality, base station 400 performs handover processing in accordance with the move of the terminal, when base station 400 determines that a base station other than base station 400, which has already established an RRC connection, has better radio quality than base station 400.

In this way, according to Embodiment 2, after an RRC connection is established between a terminal and the base station, the base station makes the terminal measure radio quality, so that the base station can perform handover processing for the terminal. This eliminates the necessity for reestablishing a call connection.

The present embodiment has shown that mobility processing can be realized before a response from the upper layer node. How a message from the upper layer node is actually processed will be explained here using FIG. 9.

Figure 9:
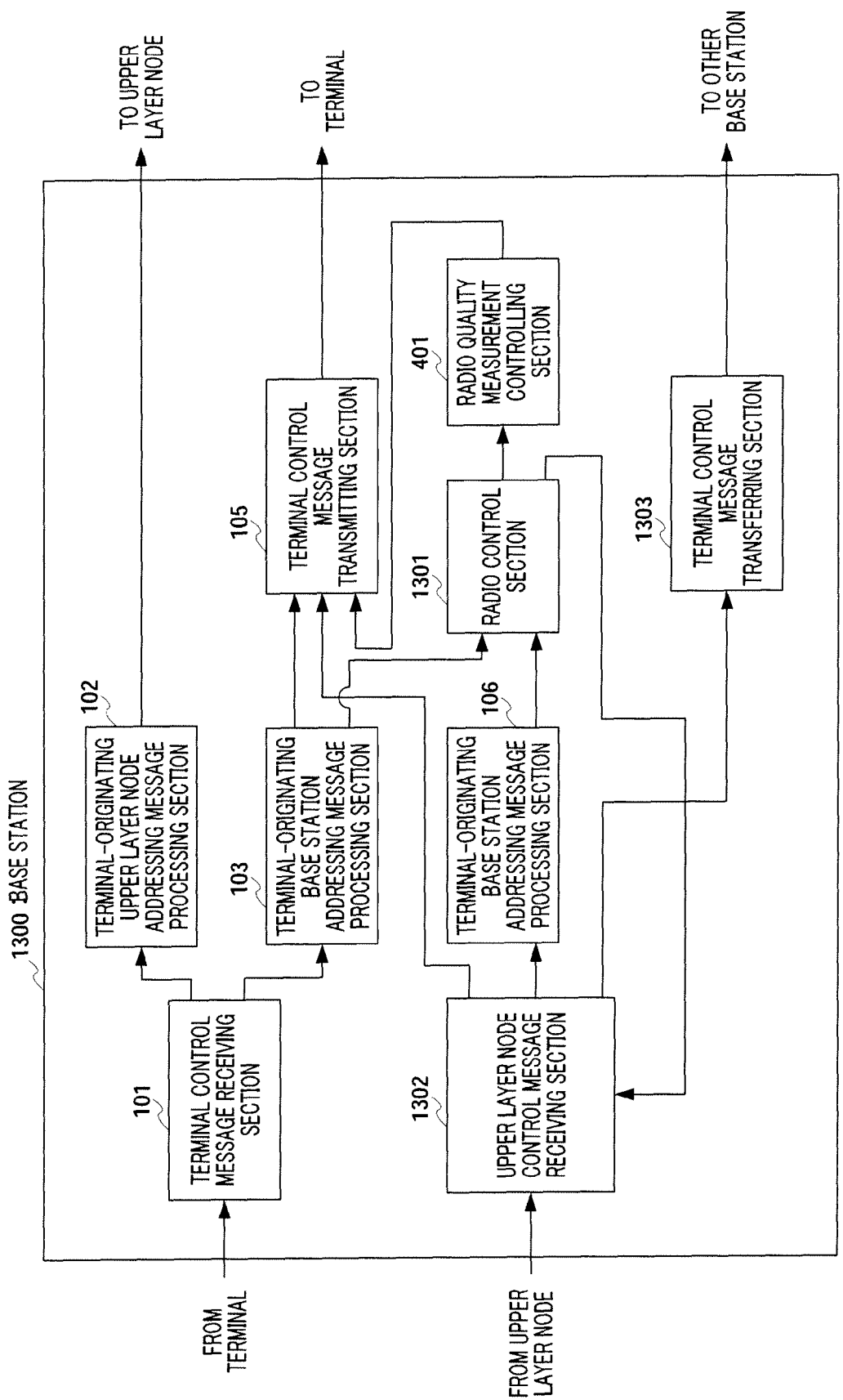
FIG. 9 is a block diagram showing the configuration of the base station apparatus according to Embodiment 2 of the present invention.

Referring to FIG. 9, when radio control section 1301 performs mobility processing, that is, handover processing, radio control section 1301 notifies the information to upper layer node control message receiving section 1302. By this means, upper layer node control message receiving section 1302 is able to detect whether or not the address of the terminal to which the upper layer node transmits the control message, is under this base station.

Actually, when upper layer node control message receiving section 1302 receives the control message from the upper layer node, upper layer node control message receiving section 1302 checks first whether or not the terminal applicable to the control message is under this base station. When the terminal is under the base station, the processing is performed for one or both of terminal control message transmitting section 105 and upper layer node-originating base station addressing message processing section 106 as in conventional cases. On the other hand, when the terminal is not under the base station, the signal is transmitted to terminal control message transferring section 1303 and transferred to the other base station.

Figure 10:
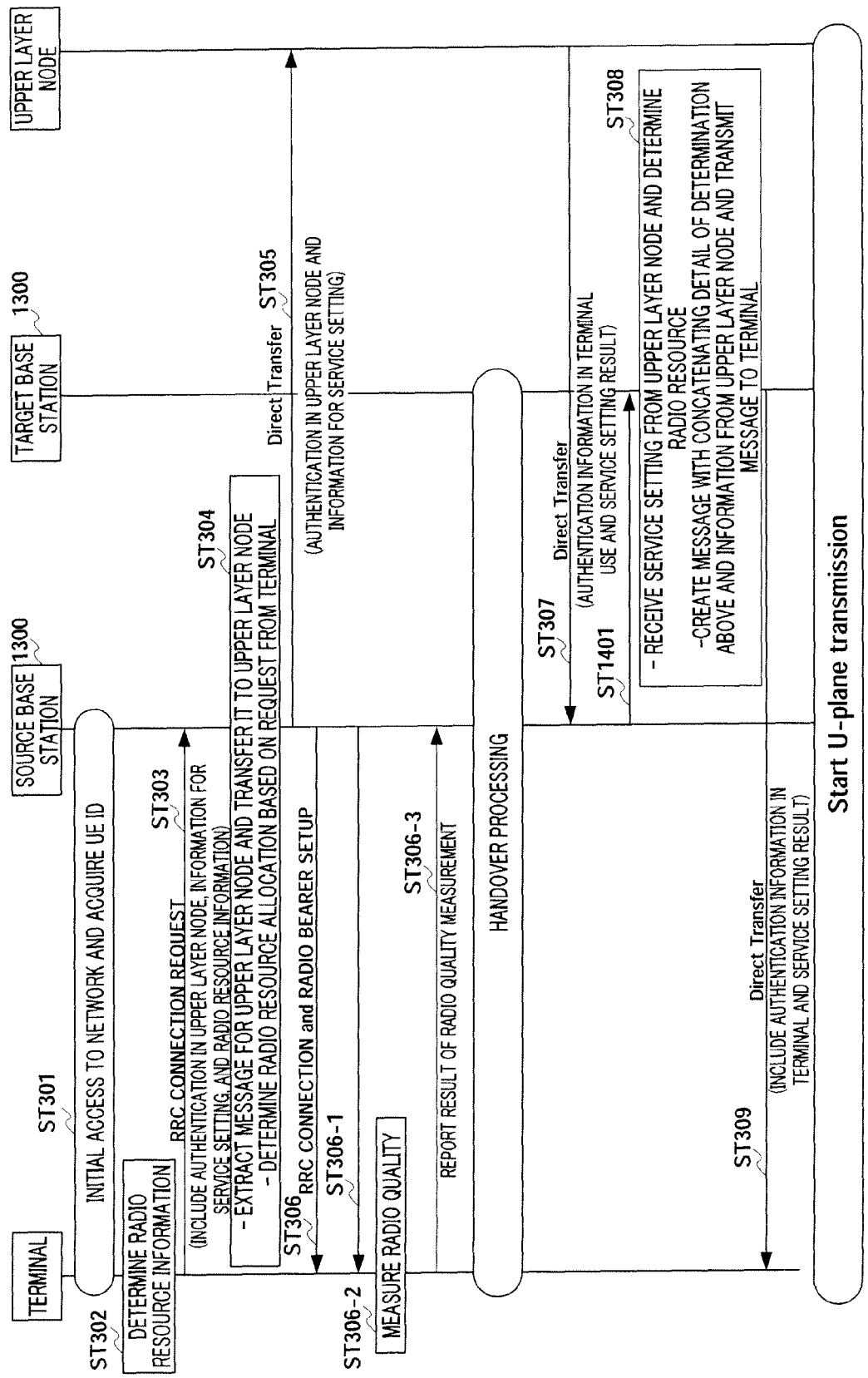
FIG. 10 illustrates a sequence diagram showing the operations of the network according to Embodiment 2 of the present invention.

The operations of the network at this time will be explained using FIG. 10. Further, in FIG. 10, the same reference numerals are assigned to the same parts as in FIG. 8, and description thereof in detail is omitted. Referring to FIG. 10, in ST1401, a message transmitted from the upper layer node in ST307 is transferred from the source base station and to the target base station. After that, the target base station processes ST308, and, in ST309, the target base station transmits the message to the terminal.

Figure 11:
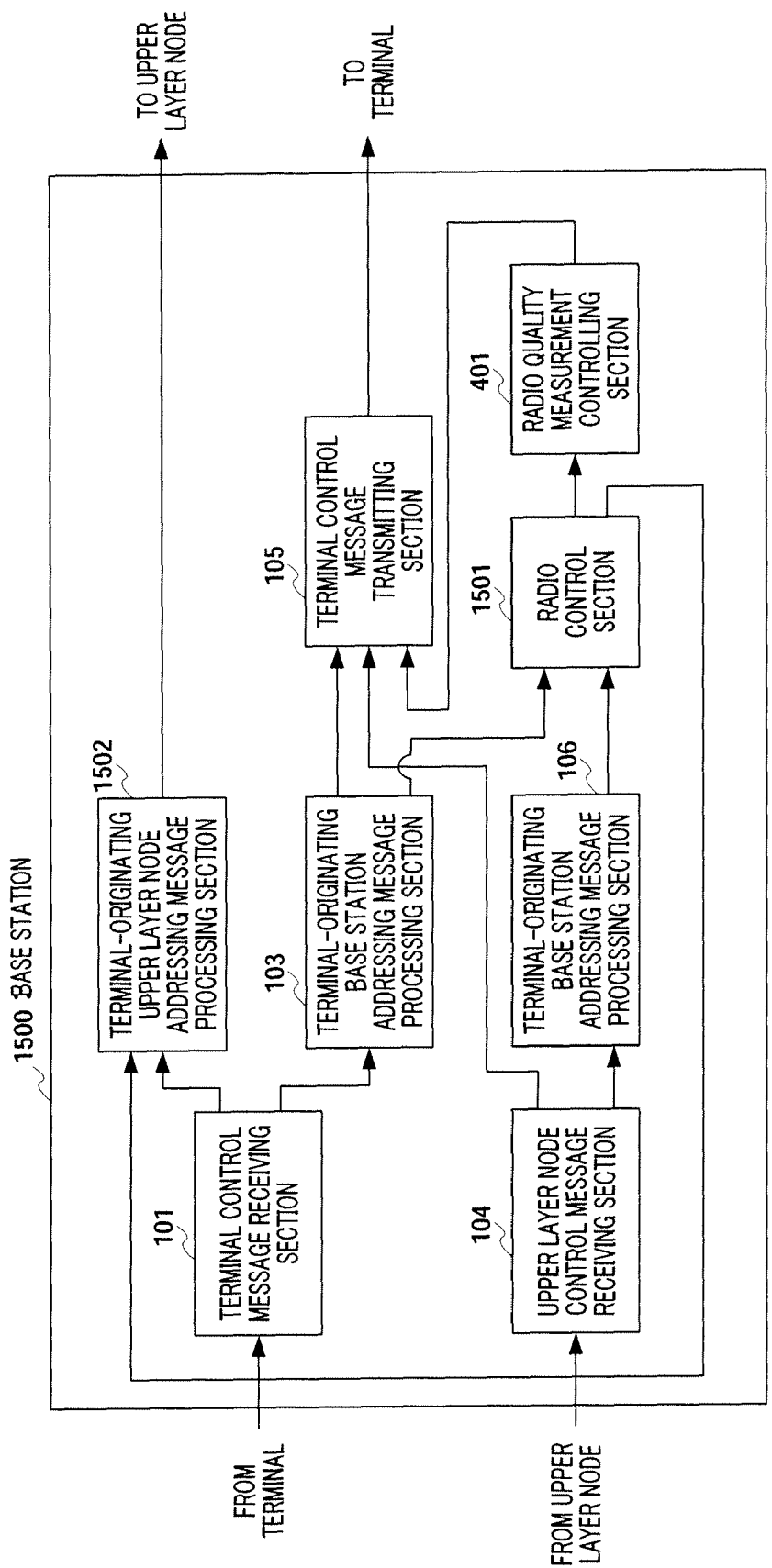
FIG. 11 is a block diagram showing the configuration of the base station apparatus according to Embodiment 2 of the present invention.
Figure 12:
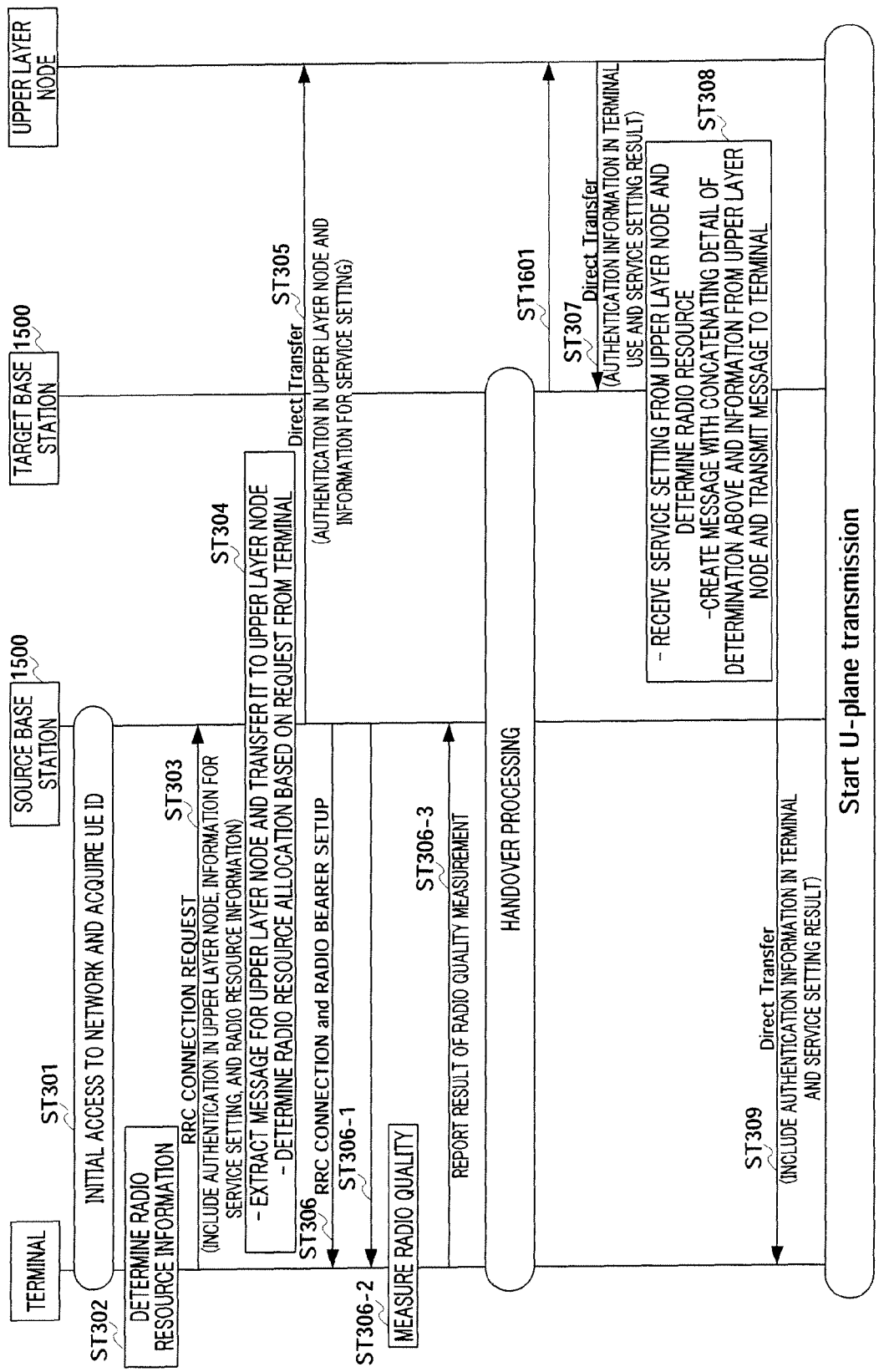
FIG. 12 illustrates a sequence diagram showing the operations of the network according to Embodiment 2 of the present invention.

Besides the operations described above, it is also possible to send a message from the upper layer node to the target base station from the beginning by showing to the upper layer node that handover processing has been performed. FIG. 11 shows the configuration of the base station, and FIG. 12 shows the operations of the network. Referring to FIG. 11, radio control section 1501 notifies terminal-originating upper layer node addressing message processing section 1502 that transfer control is performed.

Upon receiving the notice of the transfer control, terminal-originating upper layer node addressing message processing section 1502 notifies to the upper layer node that the base station managing the terminal is changed. This change message corresponds to ST1601 in FIG. 12.

Although an explanation is given here where the target base station transmits the message to the upper layer node, the source base station may also transmit the message. Moreover, although a case has been explained here where the change message is transmitted after the handover processing, the change message may be transmitted during handover processing.

By combining the configurations shown in FIG. 9 and FIG. 11, it is possible to implement sending the notice directly to the target station if the notice for the upper layer node is in time and transferring the notice from the source station if the notice for the upper layer node is not in time.

Incidentally, network sharing is a technique related to network management defined in UMTS. In this concept, a core network exists for each operator, which needs to have the core network in view of user management and billing, but, facilities such as base stations needed to be located in areas, are shared and used between the operators. This makes it possible for the operators to reduce investment cost.

Figure 13:
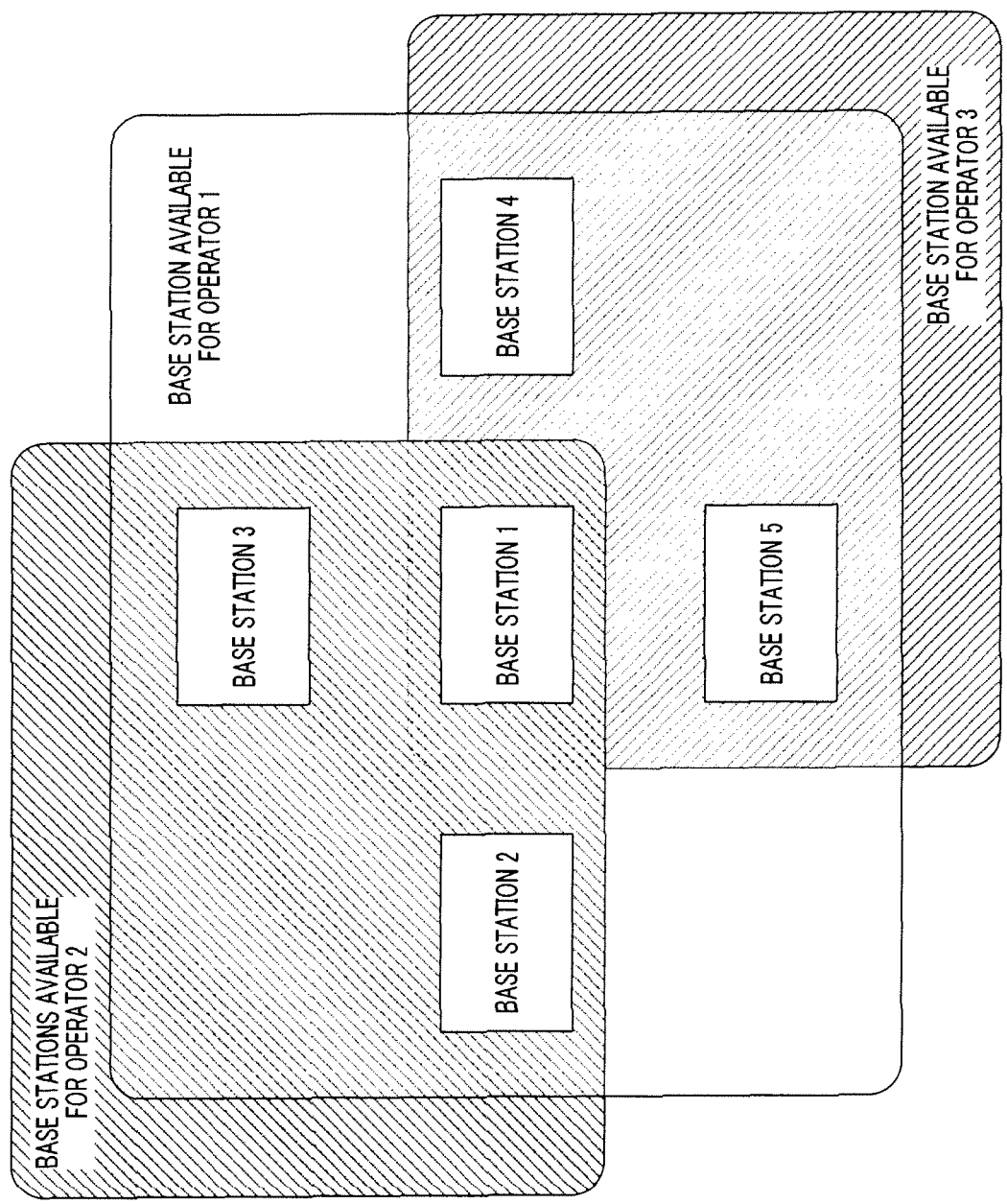
FIG. 13 illustrates a concept showing the relationships between the operators and the supporting base stations.

However, in such a case, it is likely that all terminals cannot be used in all the neighboring cells. FIG. 13 shows the conceptual diagram of network sharing as such. In FIG. 13, the relationships between the operators and the corresponding base stations are as follows. That is, base stations available for the operator 1 are the base stations 1 to 5, base stations available for the operator 2 are the base stations 1 to 3, and base stations available for the operator 3 are the base stations 1, 4 and 5.

In this case, for example, when the terminal belongs to the base station 1 for the operator 2, the base stations that can actually perform handover are only the base stations 2 and 3. Because of this, the base station 1 needs to perform mobility control taking into consideration the above.

Figure 14:
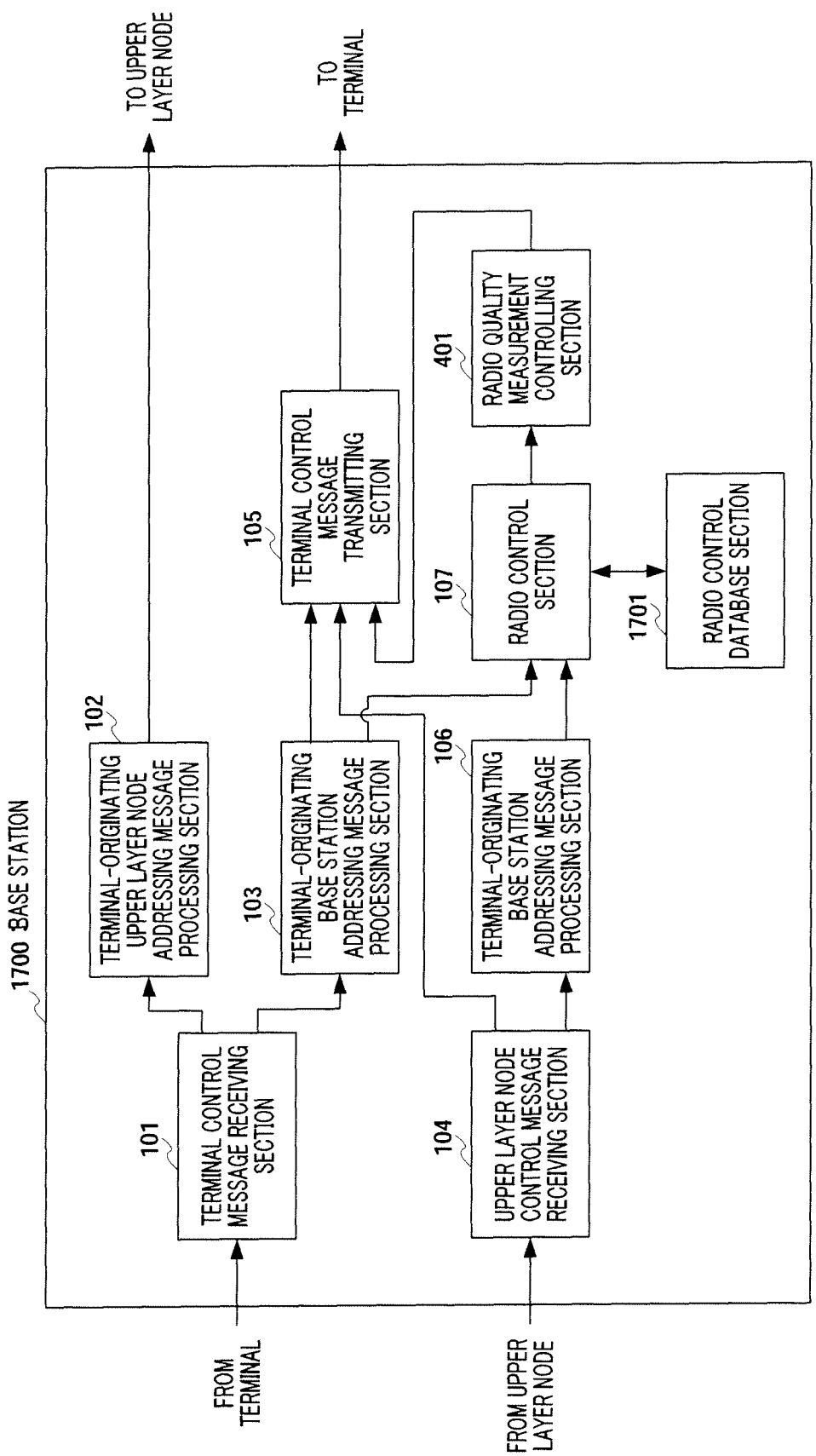
FIG. 14 is a block diagram showing the configuration of the base station to which network sharing is applied.

FIG. 14 is a block diagram showing the configuration of base station 1700 where network sharing is applied. In FIG. 14, radio control database section 1701 stores the relationships between the operators and the corresponding base stations in a database. The relationships between the operators and the corresponding base stations may be set up from the upper layer node or may be set up in advance.

Figure 15:
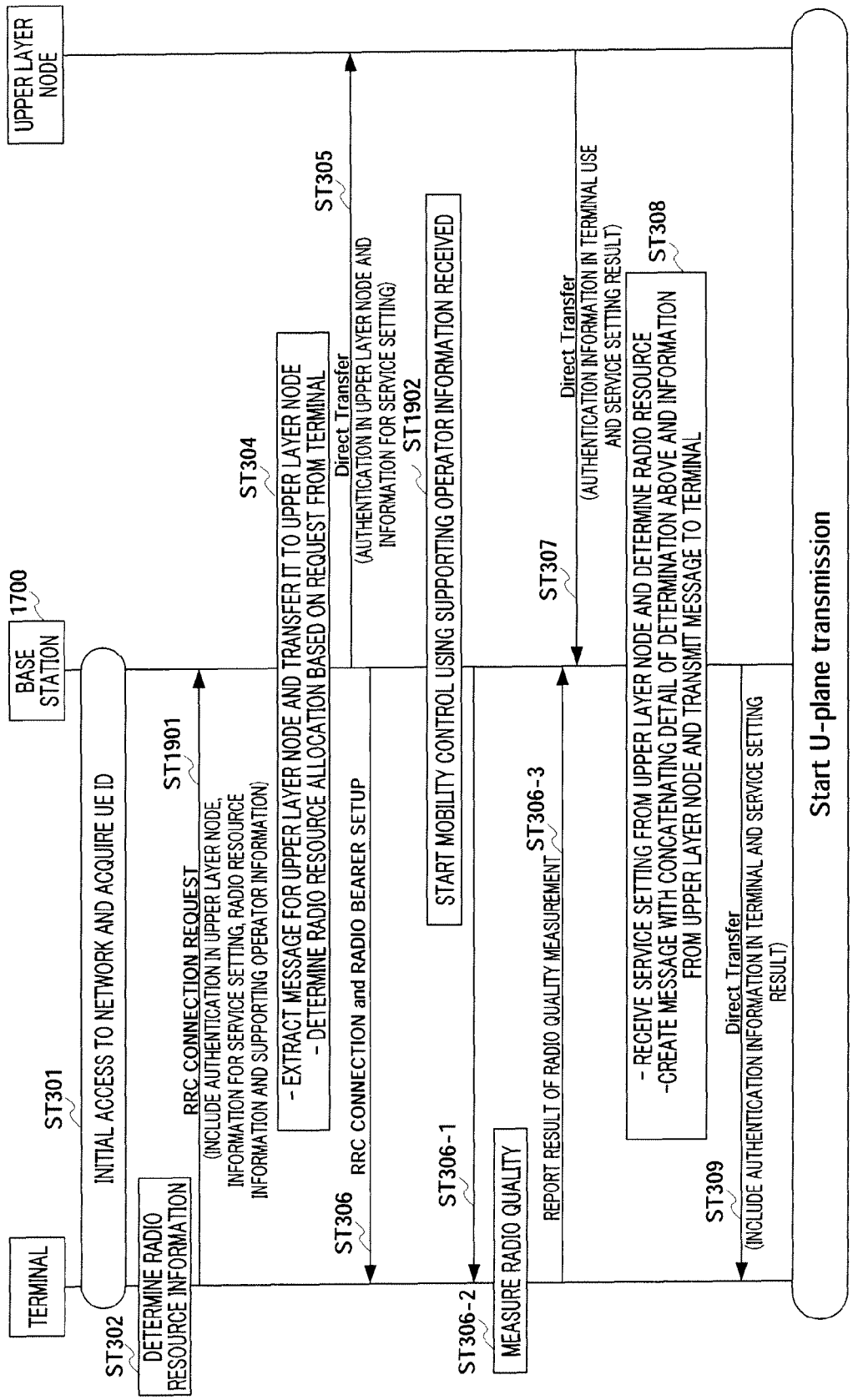
FIG. 15 illustrates a sequence diagram showing the handover steps between the base stations to which network sharing is applied.

Next, the steps of handover between the base stations where network sharing is applied will be explained using FIG. 15. Referring to FIG. 15, in ST1901, the terminal transmits the supporting operator information to base station 1700. The operator information specifically includes the PLMN ID defined in the 3GPP but is not limited.

In ST1902, the base station starts mobility control using the operator information transmitted in ST1901. Referring to an example shown in FIG. 13, when operator information shows the operator 2, base station 1700 defines the base stations 2 and 3 supporting the operator 2 as the destination candidates to perform mobility control.

Figure 16:
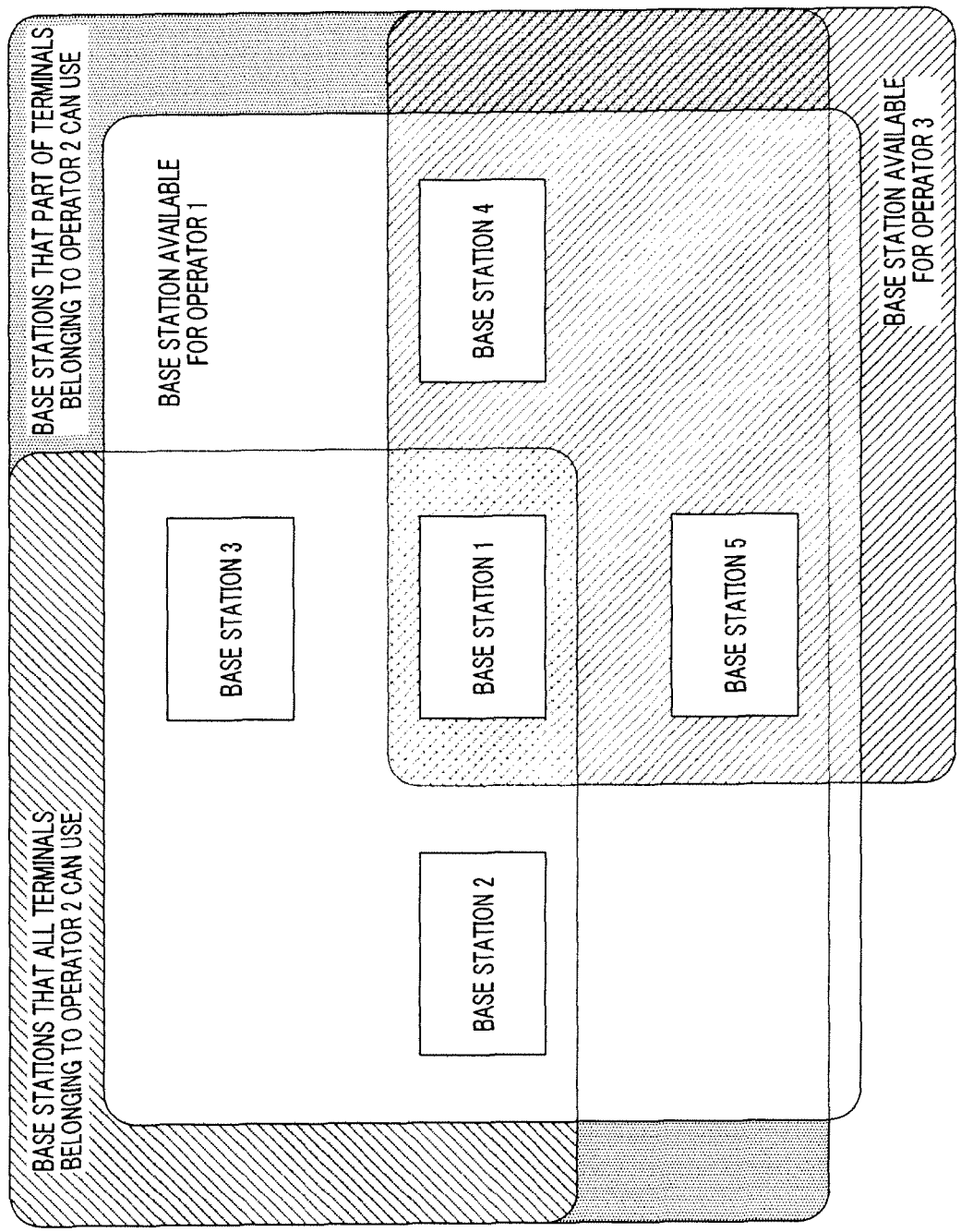
FIG. 16 illustrates a concept showing the relationship of the operators and the supporting base stations.

There are cases where whether or not a base station can be used is determined by the status of user agreement even in an operator, and, this case will be explained using FIG. 16. In FIG. 16, the relationships between the terminals belonging to the operator 2 and the supporting base stations will be explained as follows. That is, the base stations that all terminals can use for operator 2 are the base stations 1 to 3, and the base stations that specific terminals can use for operator 2 are the base stations 1 to 5.

In such a case, when a terminal belonging to the operator 2 makes a connection request to the base station 1, the base station 1 does not know connectable base stations defined by the agreement status of the terminal, and so, selects only the base station 2 and 3 that all terminals can use as base station candidates. After that, the base station 1 performs change processing after the connectable base station is learned from a response from the upper layer node (equivalent to ST307 in FIG. 15).

Radio control database section 1701 in FIG. 14 can store the relationships between the status of user agreements in the operators and the supporting base stations, in addition to the relationships between the operators and the supporting base stations. In such a case, the base station can perform transfer control depending on agreement status from the beginning by notifying ST1901 in FIG. 15 further including the agreement statuses to the base station. Moreover, these agreement statuses transmitted from this terminal may be unreliable information for the base station. Consequently, if a certain level of trust has been built between the base station and the terminal, the base station trusts that information and performs control, and, when trust has not been built with this terminal, the base station can perform control by ignoring the information. This trust will be explained in detail in Embodiment 6 (described later).

Embodiment 3

Figure 17:
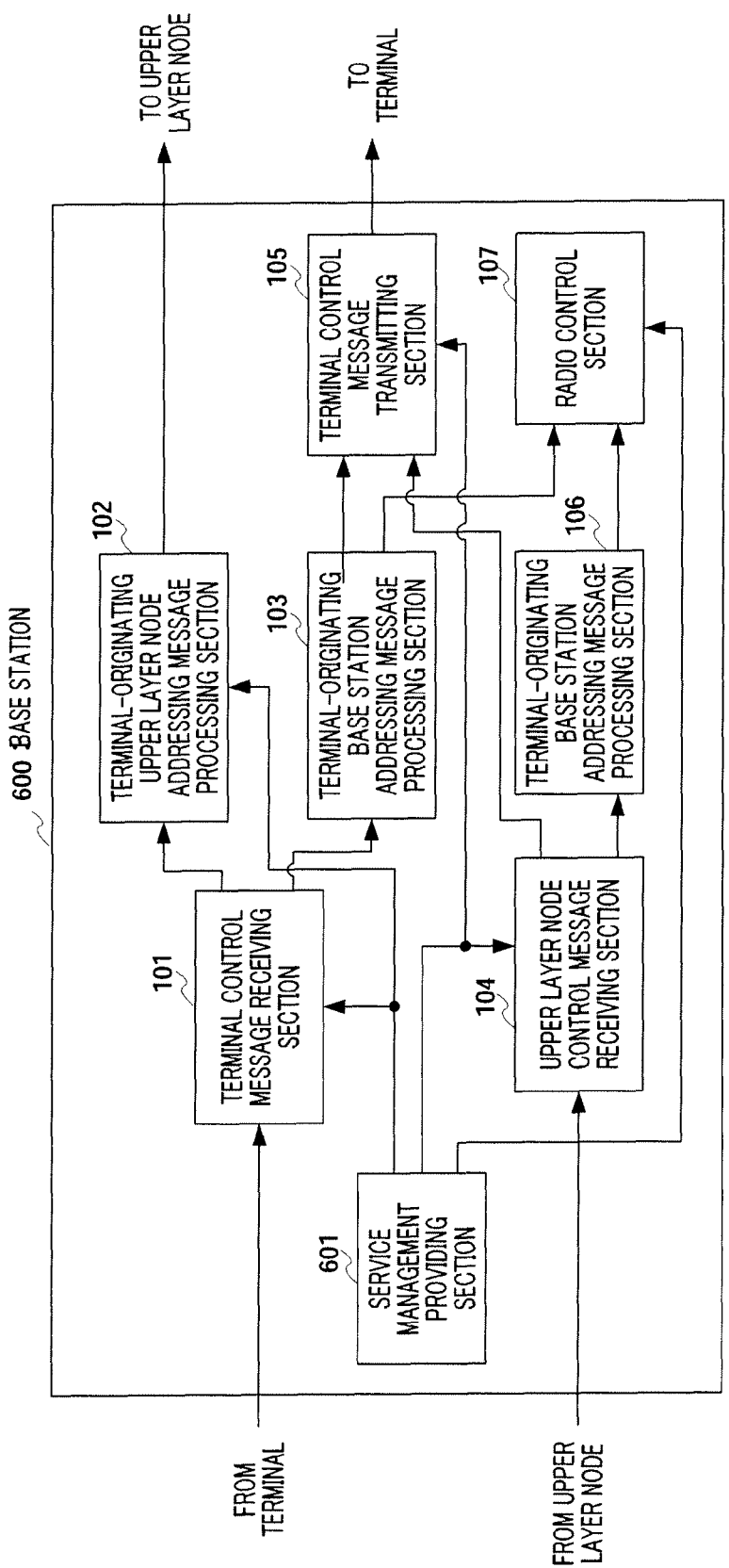
FIG. 17 is a block diagram showing the configuration of the base station apparatus according to Embodiment 3 of the present invention.

FIG. 17 is a block diagram showing the configuration of base station 600 according to Embodiment 3 of the present In this figure, providing service management section 601 manages the available services before the upper layer node issues an authentication and determines the details of services, and, when providing service management section 601 provides the managed service, providing service management section 601 outputs control information for providing services to terminal control message receiving section 101, terminal-originating upper layer node addressing message processing section 102, upper layer node control message receiving section 104, terminal control message transmitting section 105 and radio control section 107. These services include a SIP signaling message (hereinafter abbreviated as "SIP Signaling"), for example. That is, a SIP Signaling is a control operation before a terminal actually receives a service, and, after this processing, it is possible to provide the service the terminal wants to use first. Because of this, transmitting and receiving SIP Signaling as early as possible reduces the time required for starting actual service.

Figure 18:
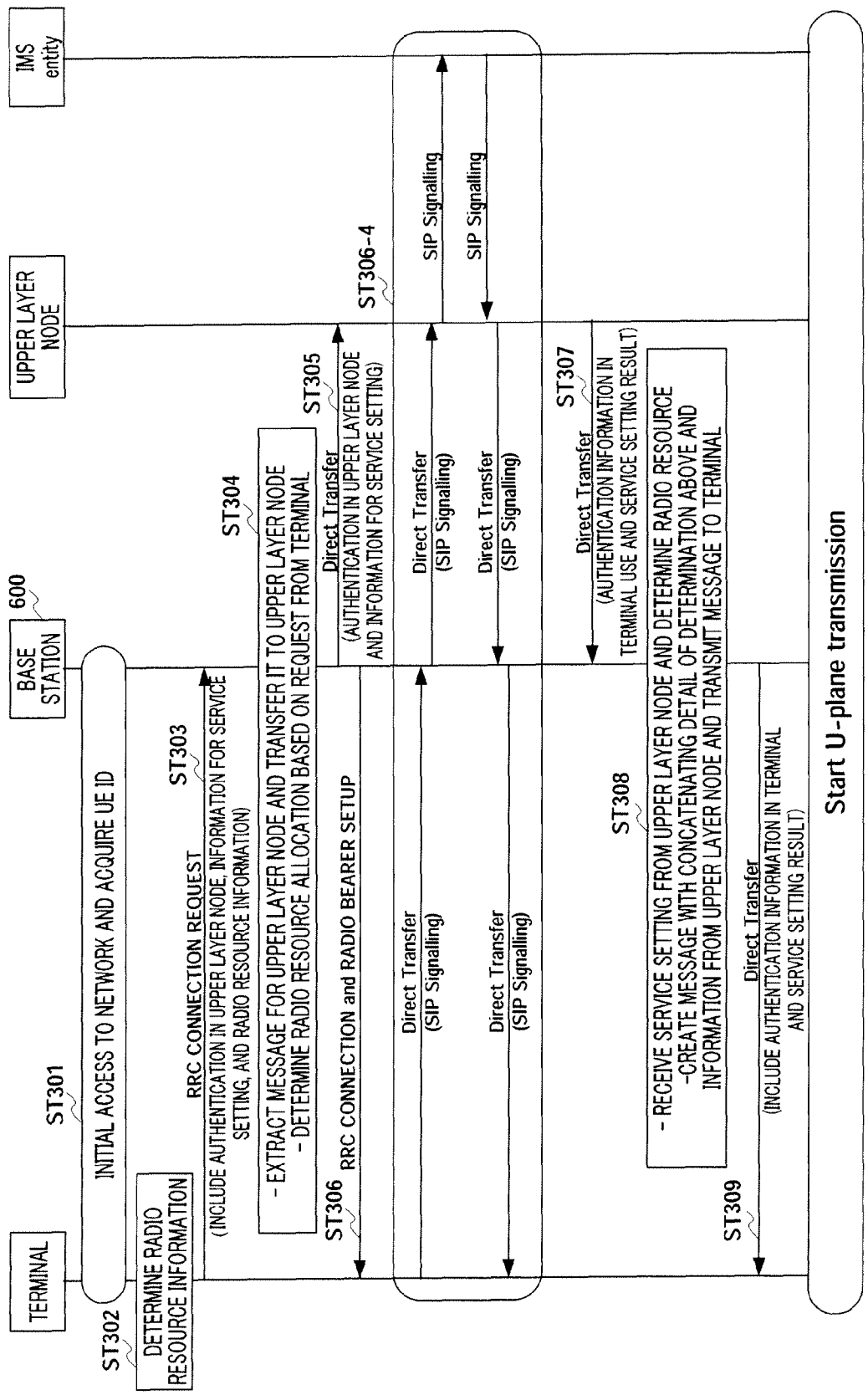
FIG. 18 illustrates a sequence diagram showing the operations of the network according to Embodiment 3 of the present invention.

FIG. 18 is a sequence diagram showing the operations of the network according to Embodiment 3 of the present invention. Further, in FIG. 18, the same reference numerals are assigned to the same parts as in FIG. 5, and description thereof in detail is omitted. Referring to FIG. 18, in ST306-4, the terminal transmits a direct transfer message (hereinafter abbreviated as "Direct Transfer") including a SIP Signaling to base station 600, base station 600 transfers them to the upper layer node, and the upper layer node transfers them to the IMS entity, sequentially. Then, the IMS entity transmits the SIP Signaling to the upper layer node, the upper layer node transfers it to base station 600, and base station 600 transfers it to the terminal, sequentially.

In this way, according to Embodiment 3, the base station establishes an RRC connection with a terminal before acquiring an authentication and a service level from the upper layer node, and transmits and receives a SIP Signaling between the terminal and the network via the established RRC connection, so that it is possible to reduce the time required to start the service.

A case of using a control message for providing a service has been described with the present embodiment. That is, although a case has been explained here where a SIP Signaling is included in an RRC message, the present invention is not limited to this, and, upon the RRC CONNECTION and RADIO BEARER SETUP, a channel for providing a service may be established and the service may be provided in normal data transmission and reception.

A case will be explained in detail below where a channel for providing a service is established upon the RRC CONNECTION and RADIO BEARER SETUP, and where the service is provided as normal data transmission and reception.

Figure 19:
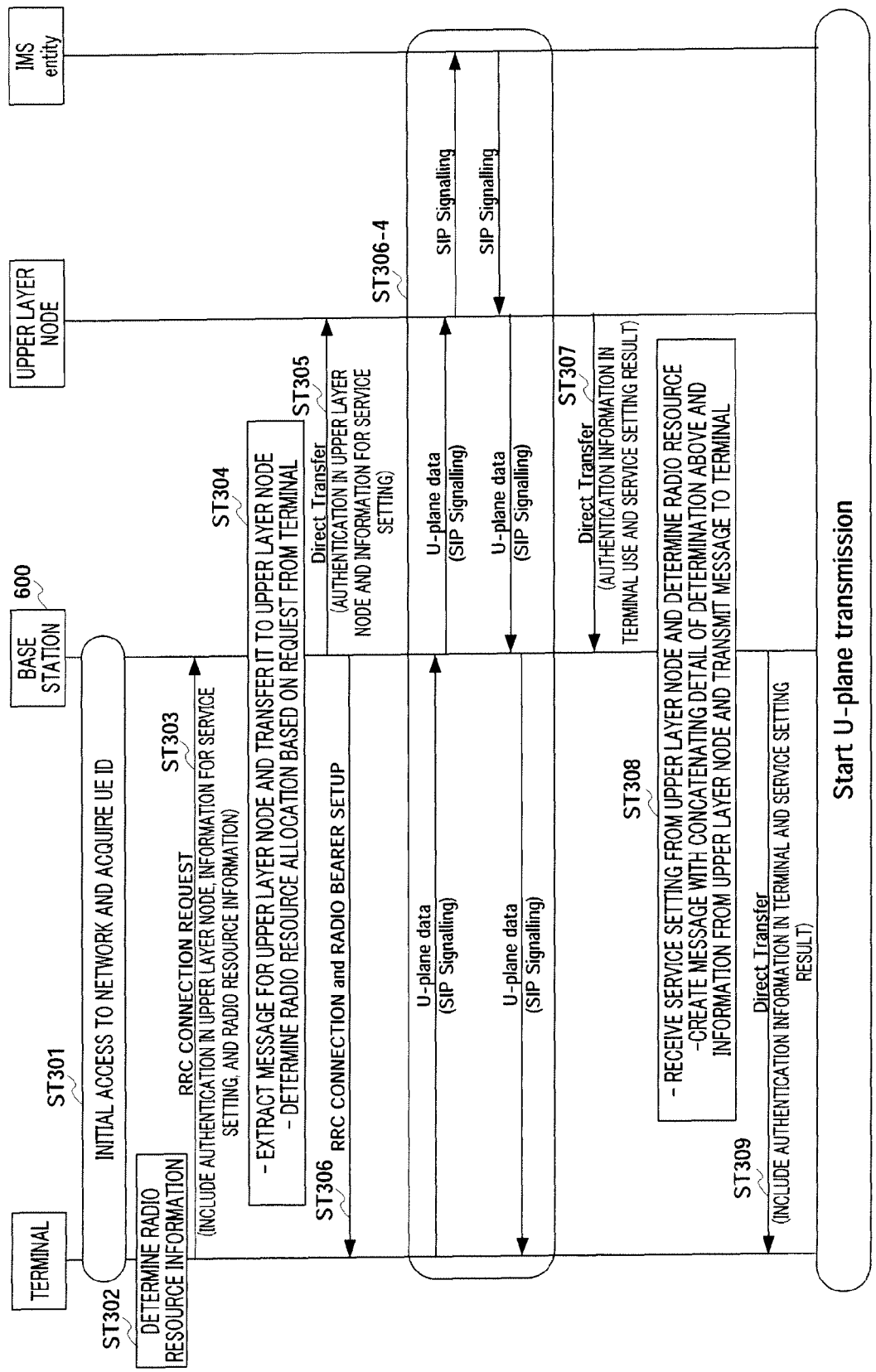
FIG. 19 illustrates a sequence diagram showing the other operations of the network according to Embodiment 3 of the present invention.

FIG. 19 is a sequence diagram showing other operations of the network according to Embodiment 3 of the present invention. FIG. 19 is different in FIG. 18 in that the channel for transmitting U-plane data established using the RRC CONNECTION and RADIO BEARER SETUP in ST306 is used between base station 600 and the terminal before a response from the upper layer node.

To be more specific, FIG. 19 is different in FIG. 18 in that, in ST306-4, SIP Signalings are transmitted using U-plane data by replacing with the Direct Transfers, between the terminal and base station 600 and between base station 600 and the upper layer node.

Next, methods of establishing a channel transmitting U-plane data in the RRC CONNECTION and RADIO BEARER SETUP in ST306 without waiting for a response from the upper layer node will be explained below. The following three methods are possible.

The first method is that, the base station acquires the information about the amount of radio resources the terminal requires, and a channel is set up based on the information acquired by the base station. This is the same as "determining the assignment of radio resources based on the request from the terminal" in ST304.

The second method is an improvement of the first method and uses a predefined configuration. "Predefined configuration" refers to determining the patterns of setting up a channel in advance and notifying the indices of the patterns by reporting information, for example. The patterns for setting up a channel include, for example, setting up VoIP (Voice over IP) use, setting up normal web browsing use, and setting up a download type service use.

In the normal predefined configuration, the base station determines the details of setup and transmits the index for the determined setup, to the terminal. However, when a channel for transmitting U-plane data is established without waiting for a response from the upper layer node, the terminal knows the required service and so selects and transmits the index applicable to the required service to the base station. The base station judges whether or not to have an allowance of setup associated with the index to the terminal based on the index transmitted from the terminal, and performs setup if the terminal has an allowance.

The third method is to establish a channel with a common setup (default bearer) for all terminals. This may be referred to as the channel of the radio part in the default SAE bearer discussed in LTE. With this method, after the base station receives an RRC CONNECTION REQUEST (ST303) from the terminal, the base station sets up in the RRC CONNECTION and RADIO BEARER SETUP (ST306) so as to establish a channel for U-plane data, using a common setup for all terminals under the base station. In this case, "determining the assignment of radio resources based on the request by the terminal" in ST304 is no longer necessary, replaced with "determining the assignment of radio resources using common setup of the terminals under the base station."

Figure 20:
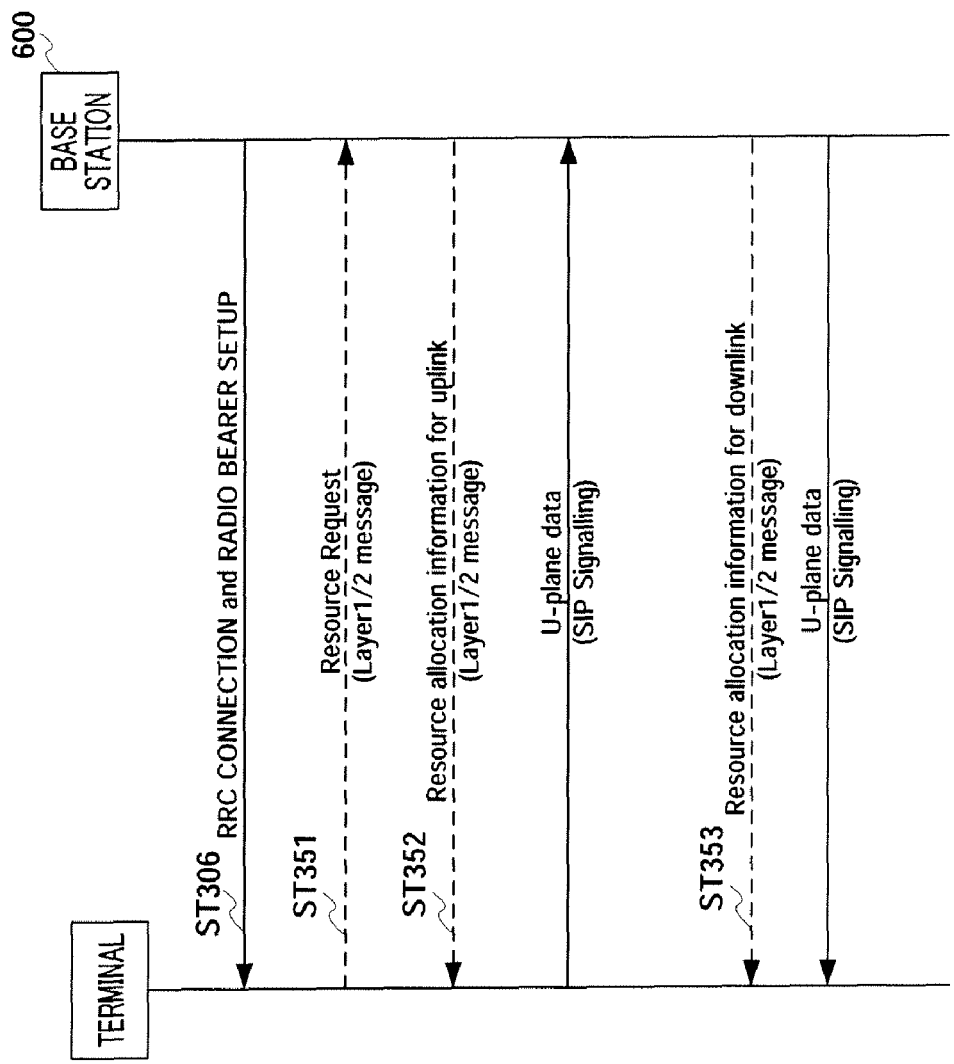
FIG. 20 illustrates a sequence diagram showing the steps of assigning resources to the terminal.

The established channel for U-plane data can set up later whether or not actually to assign data to the terminal. This will be explained in detail below. FIG. 20 is a sequence diagram showing the steps of assigning resources to the terminal.

In ST351, to transmit data on uplink, the terminal transmits a resource request (hereinafter referred to as "Resource Request"). The channel setup for transmitting this Resource Request is included in the channel settings carried out in the RRC CONNECTION and RADIO BEARER SETUP in ST306.

In ST352, based on the Resource Request transmitted from the terminal, the base station assigns resources. This channel for transmitting ST352 is also included in the channel setup performed in the RRC CONNECTION and RADIO BEARER SETUP in ST306. By this means, the terminal is able to transmit U-plane data. The control performed in ST352, that is, resource allocation to the terminal can be performed at the base station side freely, and so, when there are many terminals in the cell, the processing not to assign resources to the terminals that are not authenticated yet is possible. On the other hand, when there are a few terminals in the cell, the processing assigning resources even to the terminals that are not authenticated yet is available.

The base station also assigns resources for downlink data transmission, and so, in ST353, the base station notifies the resource allocation to the terminal. This assignment can also be performed freely by the terminal. Moreover, in accordance with not only heavy traffic information in the base station, but also information from the terminal, it is also possible to change an allocation priority. One possibility is to give a higher priority, such as when a service such as an emergency call message is requested, and, when the terminal once disconnecting a channel requests a reconnection.

Moreover, in the steps shown in FIG. 19, U-plane data is also transmitted without waiting for the response from the upper layer node between the base station and the upper layer node. That is, U-plane data for this terminal use is not set between the base station and the upper layer node. However, this can be solved by, for example, performing transmission using a fixed ID such that a normal NAS signaling message is transmitted and received between the base station and the upper layer node. Further, this method is by no means limiting.

Figure 21:
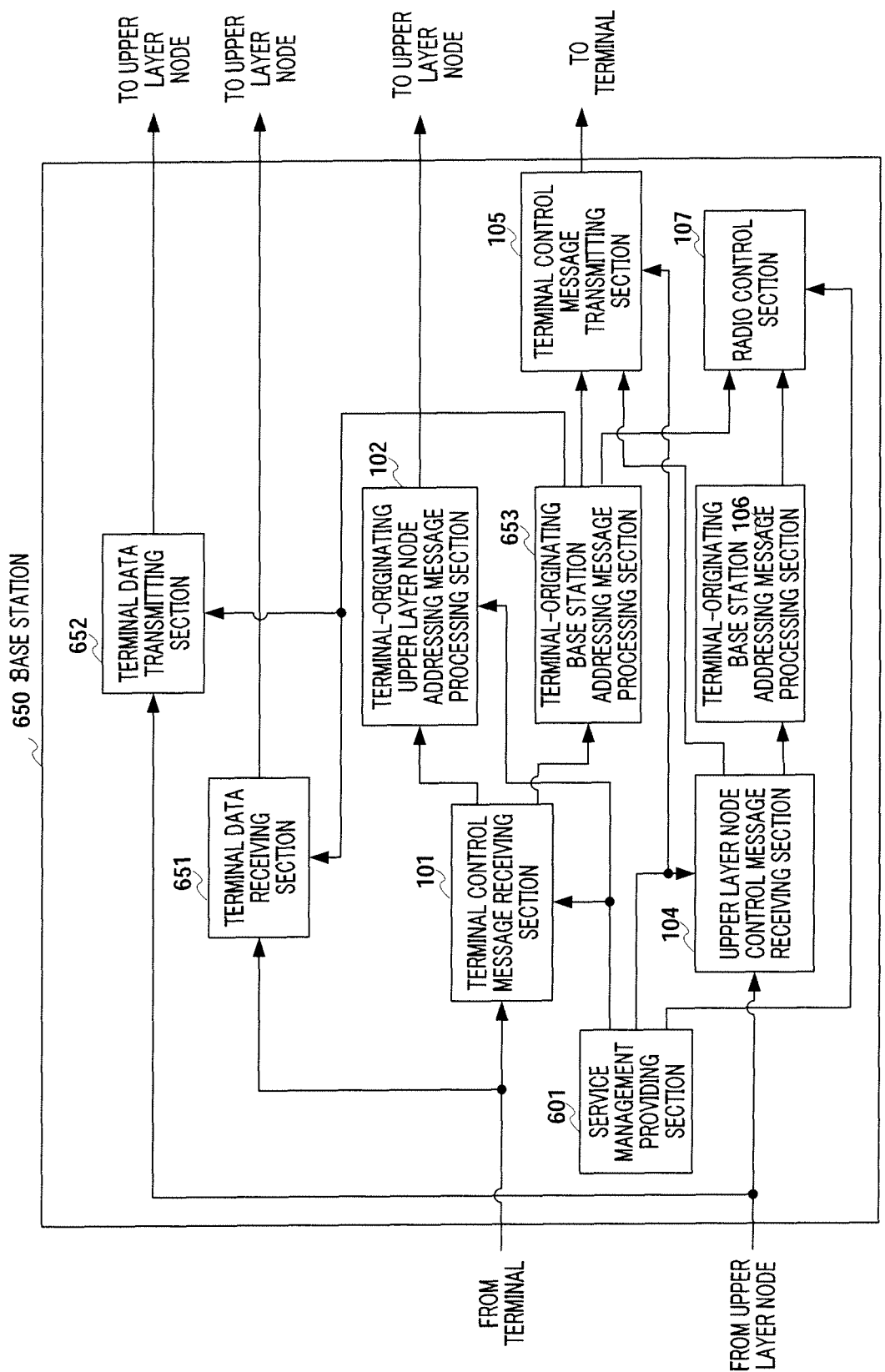
FIG. 21 is a block diagram showing the other configuration of the base station according to Embodiment 3 of the present invention.

FIG. 21 is a block diagram showing another configuration of the base station according to Embodiment 3 of the present invention. FIG. 21 is different from FIG. 17 in that terminal data receiving section 651 and terminal data transmitting section 652 are added and terminal-originating base station addressing message processing section 103 is changed to terminal-originating base station addressing message processing section 653.

Terminal data receiving section 651 receives data transmitted from the terminal, and outputs the received data to the upper layer node. Moreover, the setup for receiving is performed by terminal-originating base station addressing message processing section 653 (described later).

Terminal data transmitting section 652 receives the data transmitted from the upper layer node and transmits the received data to the terminal. Moreover, the setup for transmitting is performed by terminal-originating base station addressing message processing section 653 (described later).

Terminal-originating base station addressing message processing section 653 performs setup for transmitting and receiving with respect to terminal data receiving section 651 and terminal data transmitting section 652. Here, the channel setup is carried out according to a request (including the index) from the terminal or performed with a common setup for all terminals, and other methods may also be applicable.

Here, terminal control message receiving section 101 and terminal control message transmitting section 105 transmits and receives all control messages such as RRC, control information in layer 1 and layer 2. Because of this, as described above, for example, a Resource Request for resource allocation is received and a resource allocation information for uplink message are transmitted here.

Terminal-originating base station addressing message processing section 653 having functions for controlling RRC, layer 1 and layer 2 and performs, for example, setting up the RRC CONNECTION and RADIO BEARER SETUP in ST306, processing the Resource Request described above and setting the Resource allocation information for uplink message. Layer 2 includes RLC (Radio Link Control) and MAC (Medium Access Control) here, and the RRC CONNECTION and RADIO BEARER SETUP are controlled in RRC, the Resource Request, the Resource allocation information for uplink message, the Resource allocation information for downlink message are processed in layer 1 or layer 2, but these are by no means limiting.

Embodiment 4

The configuration of the base station according to Embodiment 4 of the present invention is the same in the configurations and partly different in the functions as shown in FIG. 3 according to Embodiment 1, and therefore this embodiment will be explained with reference to FIG. 3. In FIG. 3, based on the message transmitted from the terminal, terminal-originating base station addressing message processing section 103 judges whether or not an RRC connection and an associated channel for transmitting and receiving data channels can be set up before authentication by the upper layer node. To be more specific, when the details of the service the terminal requests is, for example, a SIP Signaling, terminal-originating base station addressing message processing section 103 judges setting up an RRC connection and an associated channel for transmitting and receiving data channels is possible, and, when a message transmitted from the terminal requests the service with low data rate, terminal-originating base station addressing message processing section 103 judges setting up an RRC connection and an associated channel for transmitting and receiving data channels is possible.

Figure 22:
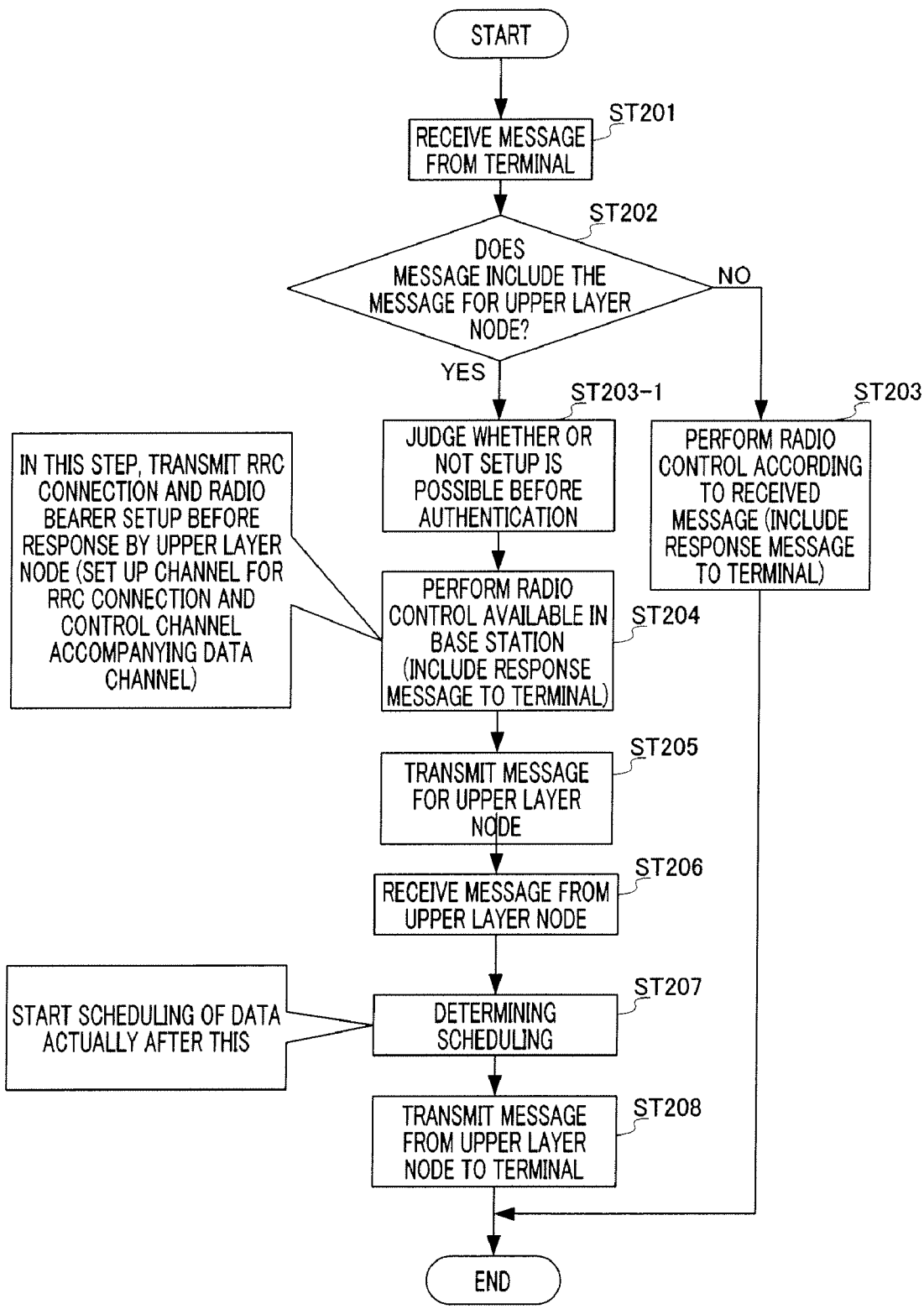
FIG. 22 illustrates a flowchart showing the operations of the base station apparatus according to Embodiment 4 of the present invention.

FIG. 22 is a flowchart showing the operations of the base station according to Embodiment 4 of the present invention. Further, in FIG. 22, the reference numerals are assigned to the same parts as in FIG. 4, and description thereof in detail is omitted. In FIG. 22, in ST203-1, based on the details of the request from the terminal, terminal-originating base station addressing message processing section 103 judges whether or not the RRC connection can be set up before authentication by the upper layer node.

In this way, according to Embodiment 4, by judging whether or not an RRC connection can be set up based on the details of a request from a terminal, it is possible to set up an RRC connection and an associated channel for transmitting and receiving data channels, for the terminal requesting a specific service, before the base station is authenticated by the upper layer node.

Embodiment 5

The configuration of the base station according to Embodiment 5 of the present invention is the same in the configurations and partly different in the functions as shown in FIG. 3 according to Embodiment 1, and therefore this embodiment will be explained with reference to FIG. 3. In FIG. 3, terminal-originating base station addressing message processing section 103 determines the radio resources required for the base station from, for example, the service information and the QoS information of this service transmitted from the terminal, notifies the determined radio resources to radio control section 107. The service information and the QoS information of this service transmitted by the terminal may be transmitted to the base station, and may be transmitted to the upper layer node and acquired by the base station.

Figure 23:
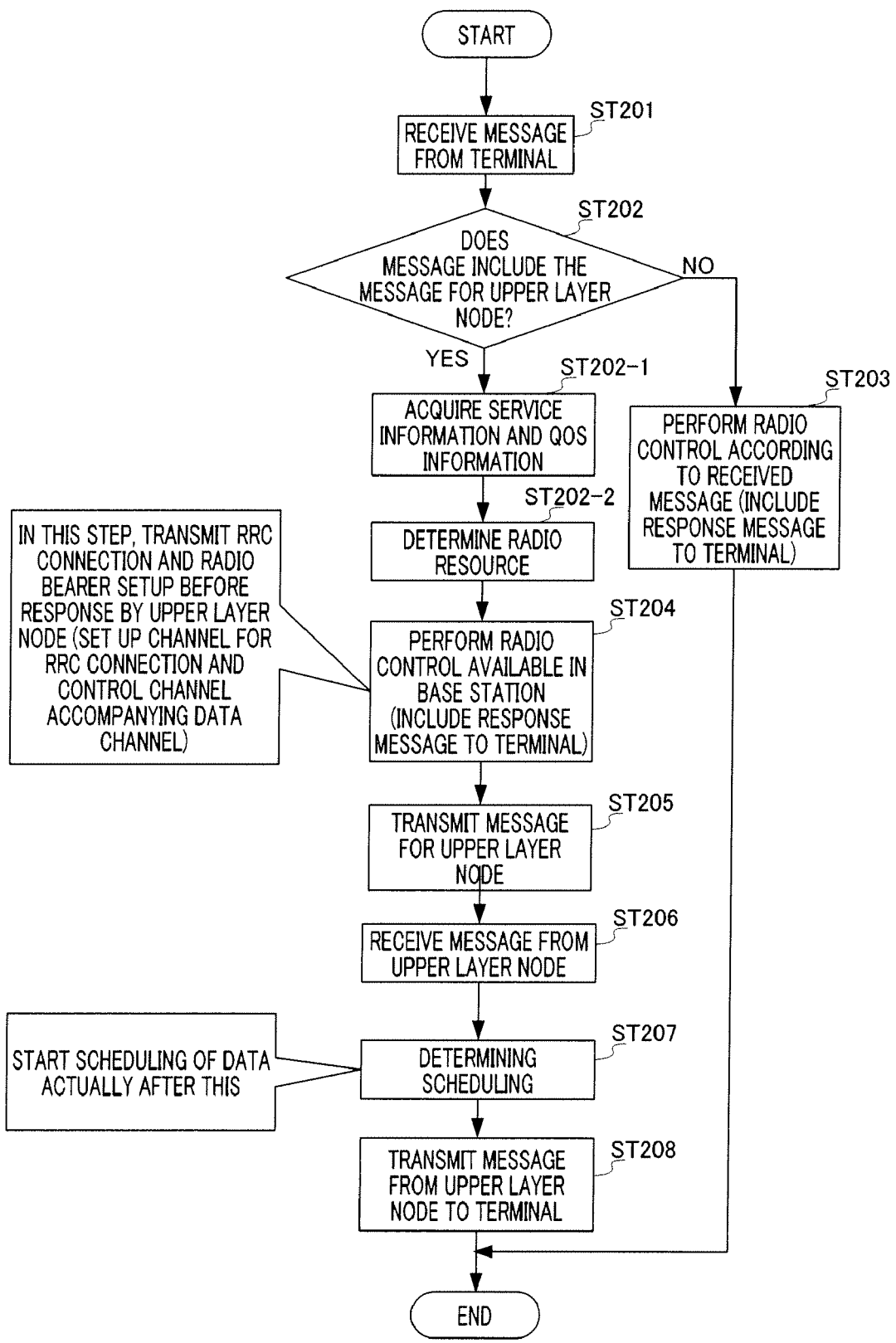
FIG. 23 is a flowchart showing the operations of the base station apparatus according to Embodiment 5 of the present invention.

FIG. 23 is a flowchart showing the operations of the base station according to Embodiment 5 of the present invention. Further, in FIG. 23, the reference numerals are assigned to the same parts as in FIG. 4, and description thereof in detail is omitted. In FIG. 23, in ST202-1, terminal-originating base station addressing message processing section 103 acquires service information and QoS information for the service transmitted from the terminal, and, in ST202-2, determines the required radio resources based on the service information and the QoS information.

Embodiment 6

As explained in Embodiment 2, a case is possible where mobility control is performed without a response from the upper layer node. However, when handover processing is accepted before the network is authenticated, cases may be possible where the network that commands handover is a dummy and carries out mobility processing that really should not be performed for the terminal. A case will be described here where a key for carrying out simple authentication or confidentiality check secret is shared between the base station and the terminal.

Figure 24:
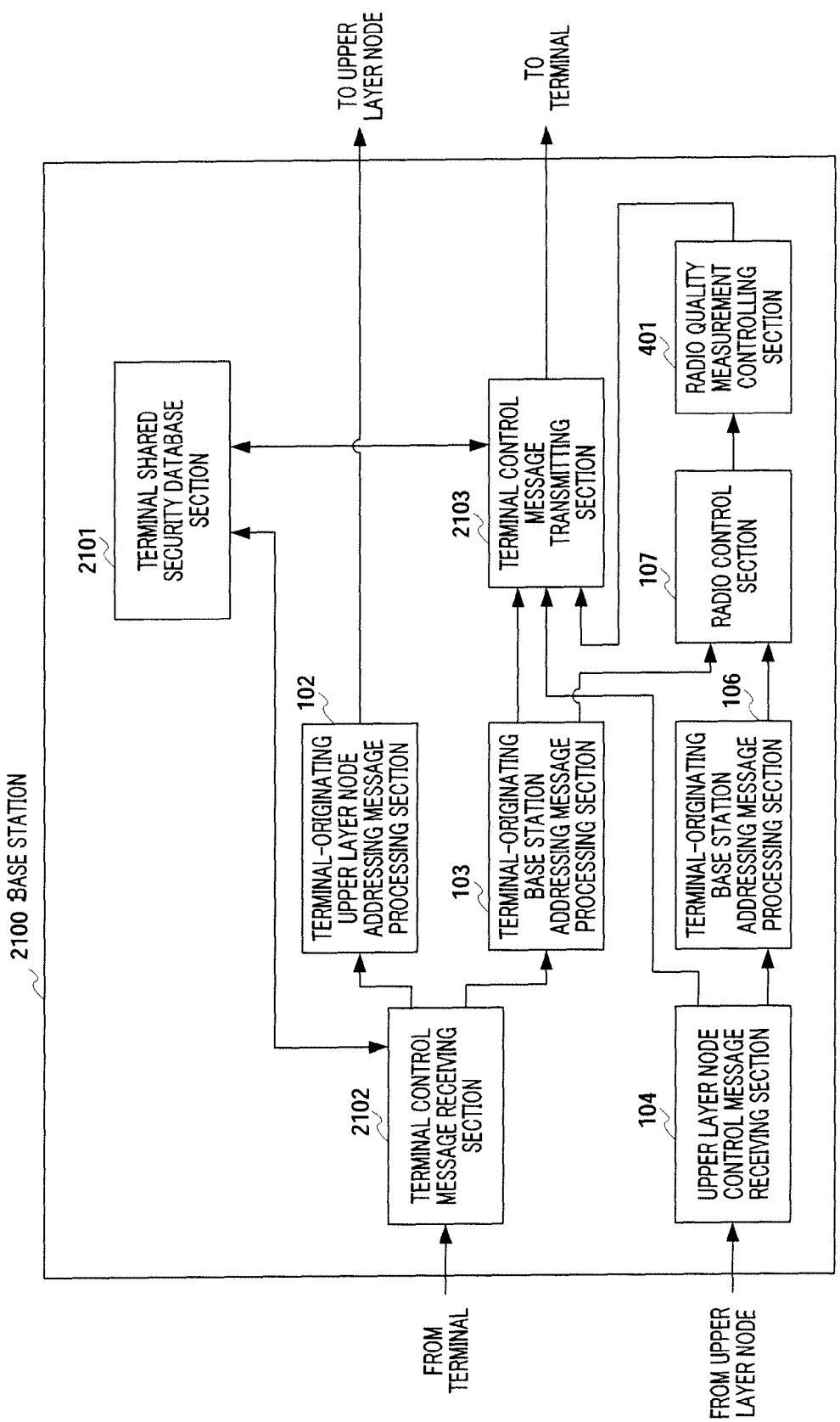
FIG. 24 is a block diagram showing the configuration of the base station apparatus according to Embodiment 6 of the present invention.

FIG. 24 is a block diagram showing the configuration of base station 2100 according to Embodiment 6 of the present invention. Terminal shared security database section 2101 stores the key used for the terminal. The ranges of use for this key includes the following: There are a key for each terminal, a key for each specific area such as a routing area and a key for each operator. Moreover, using a key for each specific area such as a routing area includes possible cases where all terminals in the specific area use the same key and where the terminals in the specific area use different keys. When all terminals in the specific area such as the routing area use the same key, keys of the number of routing areas where the base station is included, are stored in terminal shared security database section 2101. Moreover, when the terminals in the specific area such as the routing area use different keys, keys of the number of terminals recorded in the routing area where the base station is included, are stored in terminal shared security database section 2101.

When a key is used on a per terminal basis, the network and the terminal alone know the information, and so the security level increases. However, the keys for all terminal need to be stored, which requires a huge database and therefore is not practical.

When all terminals in the specific area such as the routing area use the same key and when a key for each operator is used, the security level is low, but the amount of data to be stored decreases. The embodiment will be described here presuming different keys are set up in the specific area such as routing area. A case where all terminals in the specific area such as the routing area use the same key is possible as a special example of this case and as an example of operations that can realize in the configuration of the present invention.

Terminal control message receiving section 2102 checks the message from the terminal using the key stored in terminal shared security database section 2101. As a result, unless a problem is found, normal processing is performed. In contrast, if a problem is found, terminal control message receiving section 2102 may either continue the processing as is and waits for the authentication by the upper layer node or reject the processing at this time.

In this case, terminal control message receiving section 2102 gives terminal shared security database section 2101 the specific area information of the routing area and the terminal information.

Upon transmitting a message to the terminal, when authentication processing upon call connection with respect to the terminal is not performed yet, terminal control message transmitting section 2103 acquires the key shared between the terminals from terminal shared security database section 2101, performs security processing using the acquired sharing key and transmits the message to the terminal. Upon this processing, terminal control message transmitting section 2103 gives terminal shared security database section 2101 terminal information and specific area information about the routing area, and terminal control message receiving section 2102 acquires the key applicable to the area.

Figure 25:
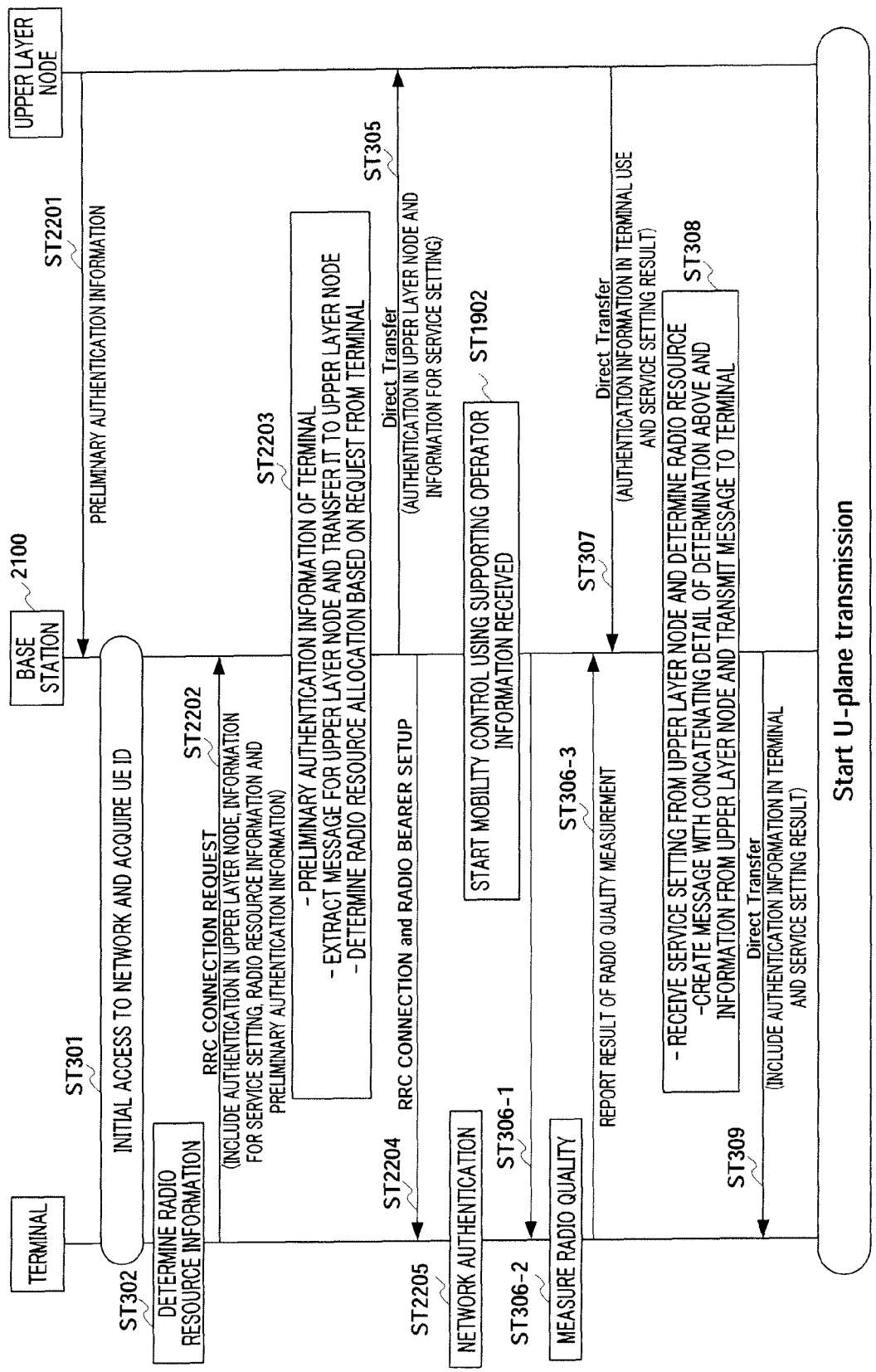
FIG. 25 illustrates a sequence diagram showing the operations of the network according to Embodiment 6 of the present invention.

Next, the operations of the network according to Embodiment 6 of the present invention will be explained using FIG. 25. Referring to FIG. 25, in ST2201, information for security (preliminary authentication information) is transmitted from the upper layer node to the base station, and stored terminal shared security database section 2101 of base station 2100.

In ST2202, the RRC CONNECTION REQUEST, which the necessary information for preliminary authentication (preliminary authentication information) is newly added, is transmitted from the terminal to base station 2100. This is used to select the key to be used in the base station.

In ST2203, the base station selects the key to use using the preliminary authentication information transmitted from the terminal, and performs authenticates using the selected key.

In ST2204, the message that is set up for authentication using the selected key is also transmitted from base station 2100 to the terminal. In ST2205, the terminal checks the message transmitted in ST2204 and judges whether or not to accept the message from the base station (i.e. network authentication).

As for the authentication by the terminal, when this authentication processing fails, the processing may be cancelled at that time or may be continued on waiting for a response from the upper layer node, without performing mobility control.

Embodiment 7

With the Embodiment 7 of the present invention, an interface between the base station and the upper layer node, for example, S1 interface will be explained based on the Embodiment 1.

Figure 26:
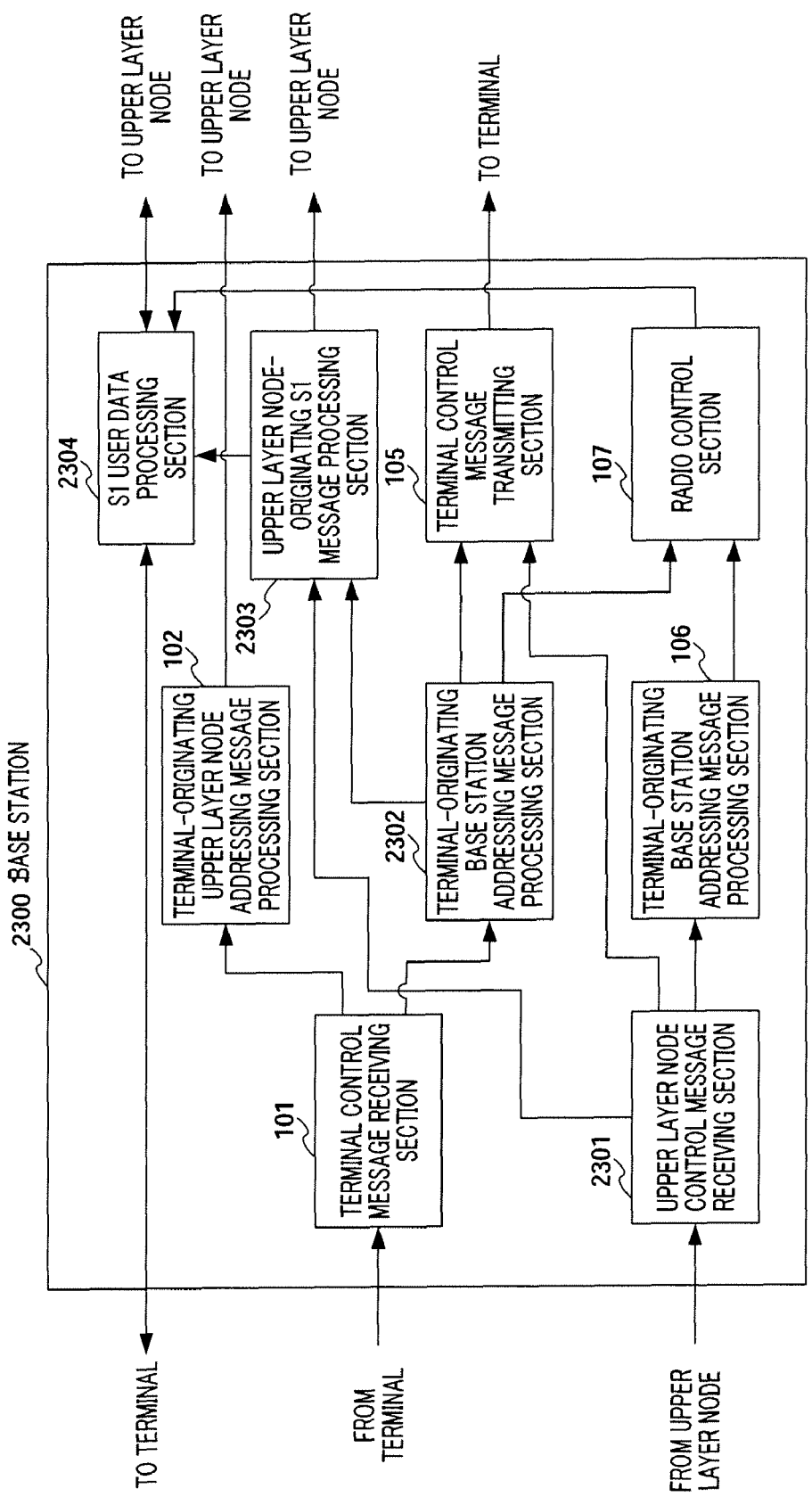
FIG. 26 is a block diagram showing the configuration of the base station according to Embodiment 7 of the present invention.

FIG. 26 is a block diagram showing the configuration of base station 2300 according to Embodiment 7 of the present invention. FIG. 26 is different from FIG. 3 in that upper layer node-originating S1 message processing section 2303 and S1 user data processing section 2304 are added, upper layer node control message receiving section 104 is changed to upper layer node control message receiving section 2301, and terminal-originating base station addressing message processing section 103 is changed to terminal-originating base station addressing message processing section 2302.

Upper layer node control message receiving section 2301 receives the control message transmitted from the upper layer nodes (a message including a NAS message, which corresponds to layer 3), and the S1 bearer setup messages (S1 setup), outputs the control messages to be processed in base station 2300, amongst the received messages, to upper layer node-originating base station addressing message processing section 106, outputs the S1 bearer setup messages to upper layer node-originating S1 message processing section 2303, and outputs the messages to be transmitted to terminal to terminal control message transmitting section 105. When one message is processed in base station 2300 and transmitted to the terminal, it is possible to duplicate the message, and outputted one to upper layer node-originating base station addressing message processing section 106 and the other to terminal control message transmitting section 105.

Terminal-originating base station addressing message processing section 2302, acquires a radio control message, out of the messages outputted from terminal control message receiving section 101, and determines setting up the radio channel according to the radio channel setup request included in the acquired radio control message. Terminal-originating base station addressing message processing section 2302 determines setting up a radio channel without receiving authentication by the upper layer node. The details of setup determined with respect to the radio channel are outputted to radio control section 107, and, meanwhile, a response message is outputted to terminal control message transmitting section 105. Moreover, when an establishment cause (reason for setup) is set up in the radio control message, terminal-originating base station addressing message processing section 2302 acquires an establishment cause and outputs the acquired establishment cause to upper layer node-originating S1 message processing section 2303.

According to the establishment cause outputted from terminal-originating base station addressing message processing section 2302, upper layer node-originating S1 message processing section 2303 determines the S1 bearer request for transferring user data in the S1 interface between the base station and the upper layer node and sets up S1 user data processing section 2304. Moreover, when upper layer node-originating S1 message processing section 2303 receives the S1 bearer setup from upper layer node control message receiving section 2301, to set up the S1 bearer at the base station side, upper layer node-originating S1 message processing section 2303 sets up S1 user data processing section 2304.

In accordance with the setup from upper layer node-originating S1 message processing section 2303, S1 user data processing section 2304 transmits and receives user data in the S1 interface.

Figure 27:
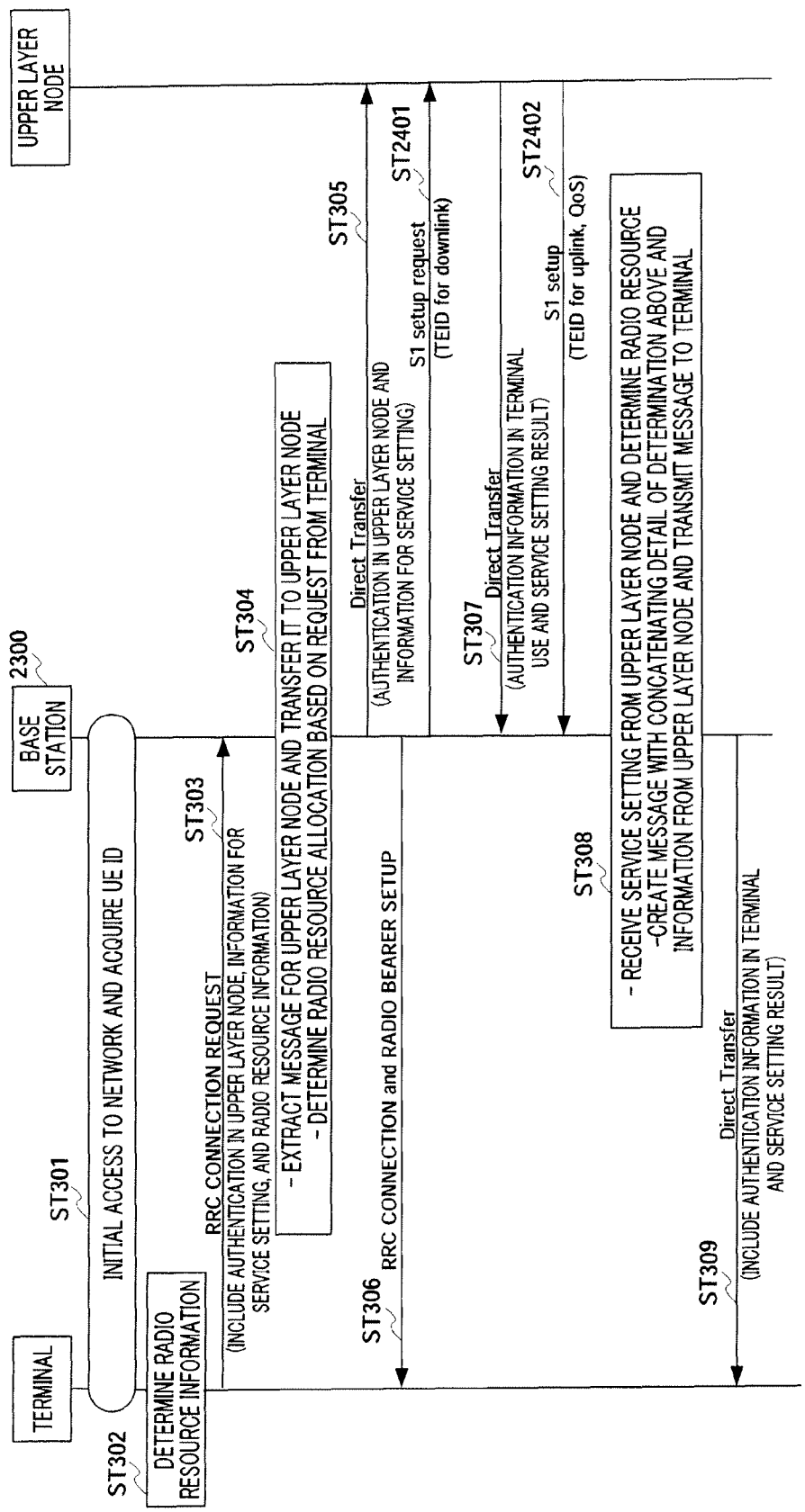
FIG. 27 illustrates a sequence diagram showing the operations of the network according to Embodiment 7 of the present invention.

Next, the operations of the network including base station 2300 described above will be explained using FIG. 27. Further, in FIG. 27, the reference numerals are assigned to the same parts as in FIG. 5, and description thereof in detail is omitted. Referring to FIG. 27, in ST303, to set up an RRC connection between base station 2300 and the upper layer node, the terminal transmits the RRC CONNECTION REQUEST, which sets up the information for the authentication in the upper layer node, the information for the service setup, the information about necessary radio resources, and the establishment cause showing the reason for setup the RRC connection, to base station 2300. Terminal-originating base station addressing message processing section 2302 of base station 2300 extracts the establishment cause set up in the received RRC CONNECTION REQUEST and outputs the establishment cause to upper layer node-originating S1 message processing section 2303.

In ST2401, upper layer node-originating S1 message processing section 2303 of base station 2300 determines whether or not to transmit the S1 setup request for transferring the user data in the S1 interface in accordance with the establishment cause. For example, when the establishment cause is an attach and tracking area update, whereby user data need not be transferred after an RRC connection is set up, not transmitting the S1 setup request is possible. Further, when user data transfer such as performing IMS recording processing is expected immediately after the attach, the S1 setup request may be transmitted. On the other hand, when the establishment cause includes a mobile originated call that requires transferring user data after an RRC connection is set up, the S1 setup request may be transmitted.

Moreover, upper layer node-originating S1 message processing section 2303 sets up the tunnel endpoint identifier on downlink (i.e. TEID for downlink) (from the upper layer node to the base station) in the S1 set up request, and transmits the S1 setup request. Moreover, the TEID for downlink is set up in S1 user data processing section 2304.

In ST2402, the upper layer node writes the received TEID for downlink, sets the QoS information derived from the information for the service setup included in the Direct Transfer received earlier and the tunnel endpoint identifier on uplink (i.e. TEID for uplink) (from the base station to the upper layer node) in the S1 setup message and transmits the S1 setup message. The upper layer node control message receiving section 2301 of base station 2300 outputs the received S1 setup to upper layer node-originating S1 message processing section 2303. Upper layer node-originating S1 message processing section 2303 extracts the TEID for uplink and the QoS information set up in the received S1 setup, and sets up the extract in S1 user data processing section 2304.

S1 user data processing section 2304 transmits and receives the user data using the set up QoS information, the TEID for downlink and the TEID for uplink.

Figure 28:
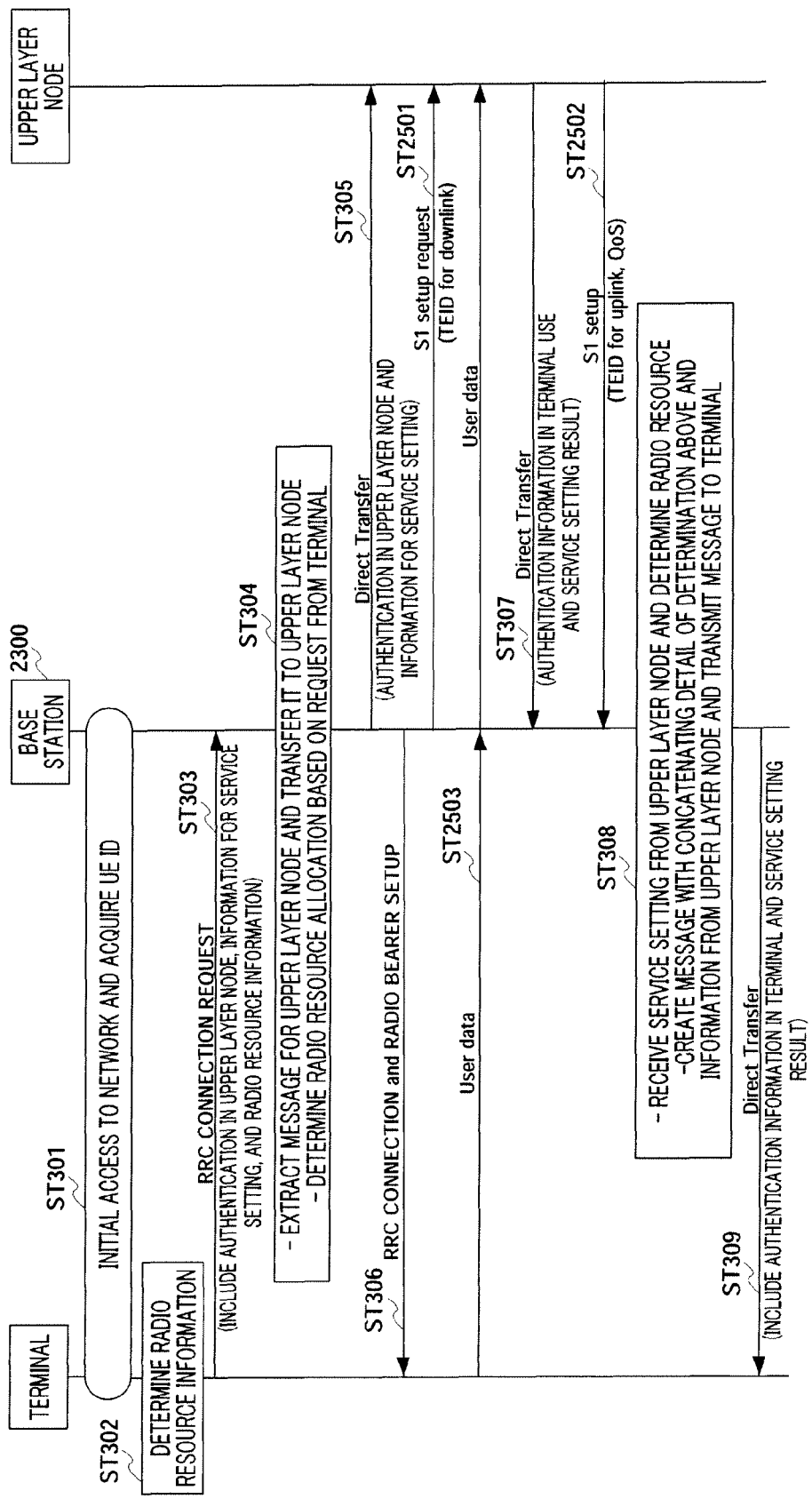
FIG. 28 illustrates a sequence diagram showing the other operations of the network according to Embodiment 7 of the present invention.

As shown in FIG. 28, in ST2503, starting user data transfer is possible before the S1 bearer is set up between the terminal and the base station. In this possible case, S1 user data processing section 2304 of the base station transfers the user data using, as the tunnel endpoint identifier, the combination of a P-TMSI (Packet Temporal Mobile Subscriber Identifier), a U-RNTI (UTRAN Radio Network Temporary Identifier), a C-RNTI (Cell Radio Network Temporary Identifier) for transferring user data notified from radio control section 107 and a cell ID/base station ID, and the combination of a S-RNTI (Serving Radio Network Temporary Identifier) and the base station ID. Incidentally, the tunnel endpoint identifier is notified to the upper layer node in advance in ST2501 or in ST305. The upper layer node processes user data using this tunnel endpoint identifier.

S1 bearer is set in ST2502, and the base station may transfer the user data using the set up S1 bearer and continue transferring the user data using the tunnel endpoint identifier in ST2503.

In this way, according to Embodiment 7, when an establishment cause is set up in an RRC CONNECTION REQUEST transmitted from a terminal, in accordance with the establishment cause, the base station transmit an S1 setup request including an TEID for downlink to the upper layer node, and the upper layer node transmits the S1 setup including an TEID for uplink to the base station, so that the base station can transfer the user data between the terminal and the upper layer node using an S1 interface.

Although with the present embodiment, ST305 and ST2401 are explained as different messages, the messages may be processed as one message. ST307 and ST2402 may also be processed as one message.

Moreover, although a case has been explained with ST303 where the upper layer node-originating S1 message processing section of the base station determines the S1 setup request in accordance with the establishment cause received from the terminal-originating base station addressing message processing section, the upper layer node-originating S1 message processing section may receive a layer 3 message such as a NAS message from the terminal-originating upper layer node addressing message processing section and may determine the S1 setup request in accordance with the received layer 3 message such as the NAS message.

Moreover, the present embodiment has been explained based on Embodiment 1, and may also be applicable to other embodiments explained above.

Embodiment 8

The configuration of the base station according to Embodiment 8 of the present invention is the same in the configurations and partly different in the functions as shown in FIG. 26 according to Embodiment 7, and this embodiment will be explained with reference to FIG. 26.

Terminal-originating base station addressing message processing section 2302 acquires a radio control message, out of the messages outputted from terminal control message receiving section 101, and determines setting up a radio channel setting according to the radio channel setup request included in the acquired radio control message. Terminal-originating base station addressing message processing section 2302 determines setting up a radio channel without receiving authentication by the upper layer node. The details of setup determined with respect to the radio channel are outputted to radio control section 107, and, meanwhile, a response message is outputted to terminal control message transmitting section 105. Moreover, when an establishment cause (reason for setup) is set up in the radio control message, terminal-originating base station addressing message processing section 2302, upon acquiring the establishment cause, outputs the acquired establishment cause to upper layer node-originating S1 message processing section 2303. On the other hand, when the establishment cause is not set up in the radio control message, terminal-originating base station addressing message processing section 2302 cannot acquire the establishment cause.

Upper layer node-originating S1 message processing section 2303 receives the S1 bearer setup (S1 setup) message from upper layer node control message receiving section 2301, and, upper layer node-originating S1 message processing section 2303 sets the S1 bearer for transferring user data in the S1 interface between base station 2300 and the upper layer node in S1 user data processing section 2304. Moreover, upper layer node-originating S1 message processing section 2303 transmits a S1 bearer setup response message (hereinafter abbreviated as "S1 setup response") to the upper layer node in response.

In accordance with the setup from upper layer node-originating S1 message processing section 2303, S1 user data processing section 2304 transmits and receives the user data in the S1 interface.

Next, the operations of the network including base station 2300 described above will be explained using FIG. 29. Further, in FIG. 29, the reference numerals are assigned to the same parts as in FIG. 5, and description thereof in detail is omitted. Although a case has been explained in FIG. 27 where the S1 bearer is set up from the base station, in FIG. 29, a case will be explained where the S1 bearer is set up from the upper layer node (a case corresponding to existing UTRAN).

Figure 29:
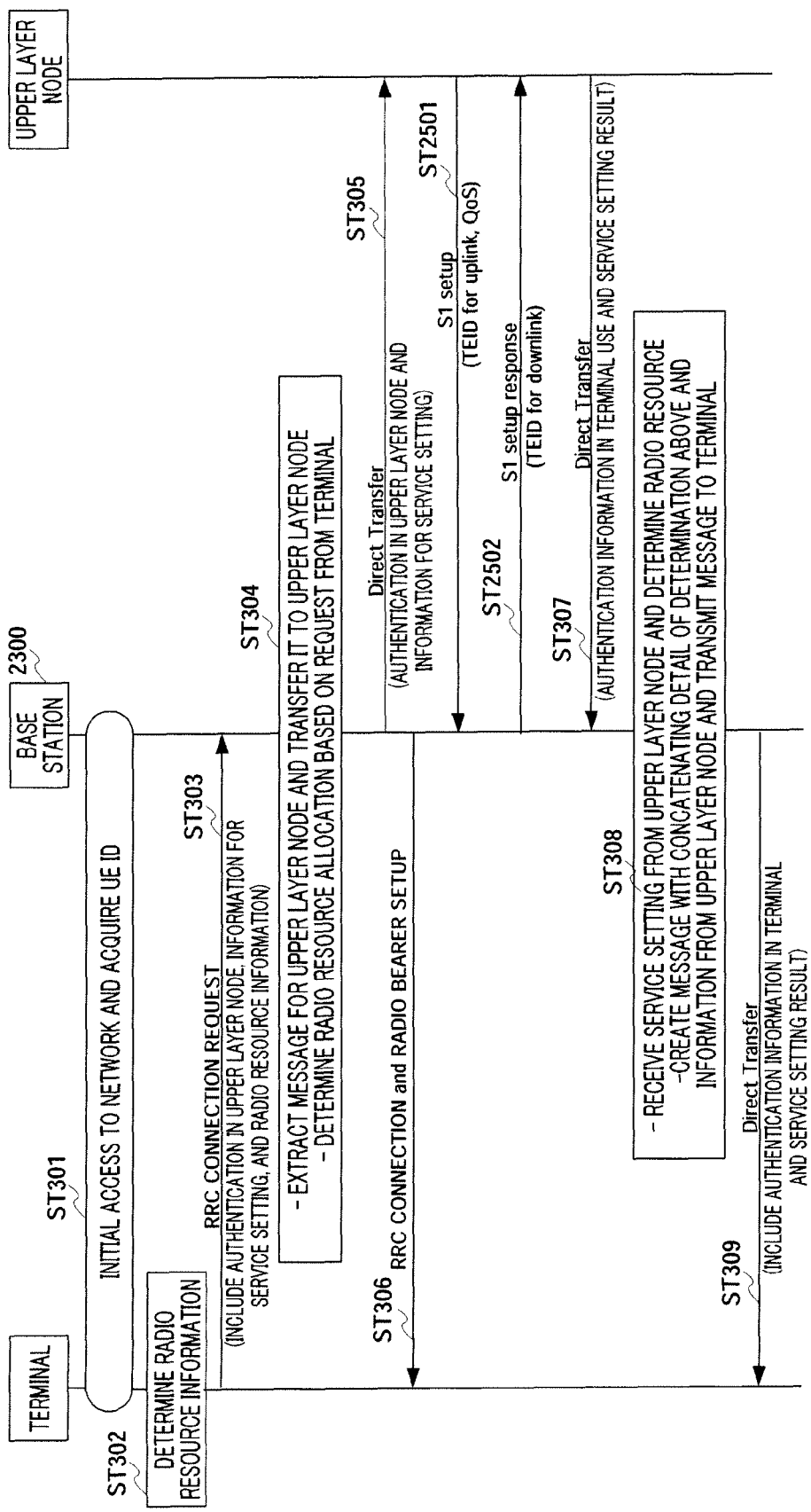
FIG. 29 illustrates a sequence diagram showing the operations of the network according to Embodiment 8 of the present invention.

In FIG. 29, in ST2501, the upper layer node determines whether or not to transmit the S1 setup for transferring user data in the S1 interface in accordance with the information for a service setup included in the Direct Transfer received in ST305.

If the information for a service setup is attach and tracking area update that are not needed to transfer user data after setting an RRC connection, not transmitting the S1 setup message is possible. Further, when user data transfer such as performing IMS registering processing immediately after the attach the S1 setup request may be transmitted. On the other hand, when the information for a service setup includes a mobile originated call that is needed to transfer user data after setting up an RRC connection, transmitting the S1 setup request is possible.

Moreover, the upper layer node sets the QoS information derived from the information for the service setup included in the Direct Transfer received earlier and the tunnel endpoint identifier on uplink (i.e. TEID for uplink) (from the base station to the upper layer node) in the S1 setup message and transmits the message. The upper layer node control message receiving section 2301 of base station 2300 outputs the received S1 setup message to upper layer node-originating S1 message processing section 2303.

In ST2502, upper layer node-originating S1 message processing section 2303 of base station 2300 sets up the received QoS information and the TEID for uplink in S1 user data processing section 2304. Moreover, upper layer node-originating S1 message processing section 2303 sets up the tunnel endpoint identifier on downlink (i.e. TEID for downlink) (from the upper layer node to the base station) in a S1 setup response and transmits the response. The upper layer node stores the TEID for downlink set in the received S1 setup response.

S1 user data processing section 2304 transmits and receives the S1 user data using the setup QoS information, the TEID for downlink and the TEID for uplink.

As shown in FIG. 30, in ST2503, starting user data transfer is possible before the S1 bearer is set up between the terminal and base station 2300. In this case, it is possible that S1 user data processing section 2304 of base station 2300 transfers the user data using, as the tunnel endpoint identifier, the combination of a P-TMSI (Packet Temporal Mobile Subscriber Identifier), a U-RNTI (UTRAN Radio Network Temporary Identifier) and a C-RNTI (Cell Radio Network Temporary Identifier) for transferring user data notified from radio control section 107 and a cell ID/base station ID, and the combination of a S-RNTI (Serving Radio Network Temporary Identifier) and the base station ID. Incidentally, the tunnel endpoint identifier is notified to the upper layer node in advance in ST2502 or in ST305. The upper layer node processes user data using this tunnel endpoint identifier.

S1 bearer is set up in ST2502, and base station 2300 may transfer the user data using the S1 bearer set up and continue transferring the user data using the tunnel endpoint identifier in ST2503.

In this way, according to Embodiment 8, according to the information for a service setup included in a Direct Transfer transmitted from the base station, the upper layer node transmits an S1 setup request including an TEID for uplink to the base station, and the base station transmits a S1 setup including an TEID for downlink to the upper layer node, so that the base station can transfer user data between the terminal and the upper layer node using an S1 interface.

Although with the present embodiment, ST305 and ST2501 have been explained to process different messages, one message may be processed in these steps. Moreover, ST307 and ST2502 may also be processed as one message.

With the embodiments described above, as represented FIG. 5, radio is set up in the RRC CONNECTION and RADIO BEARER SETUP in ST306 and the limited information such as authentication information is transmitted in the Direct Transfer in ST309, combinations of details set in these include various possible patterns. The following lists possible patterns.

With pattern 1, setting may be provided depending on channel structures. For example, in the RRC CONNECTION and RADIO BEARER SETUP, setting that is confined to the base station such as the Transport channel and the Physical channel may be provided, and, in the Direct Transfer, setting related to the upper layer node such as the Radio bearer may be provided.

Next, pattern 2 sets up C-plane and U-plane. That is, C-plane that is required at least for transmission, is set up in the RRC CONNECTION and RADIO BEARER SETUP, and, in the Direct Transfer, U-plane is set up.

Next, for pattern 3, C-plane and U-plane are set up in the RRC CONNECTION and RADIO BEARER SETUP, in addition to the control channel (CQI transmission is limited or not carried out at this time) in the RRC CONNECTION and RADIO BEARER SETUP, and setup for a command to change CQI transmission to general operations and transmitting information about CQI transmission is provided in the Direct Transfer.

Moreover, pattern 4 is that, setup other than security-related setup is provided in the RRC CONNECTION and RADIO BEARER SETUP, and the security-related setup (i.e. information for encrypting and securing confidentiality) is provided in the Direct Transfer.

Finally, pattern 5 is that, setup that does not vary between services is provided in the RRC CONNECTION and RADIO BEARER SETUP, and set up that varies between services (such as CQI transmission frequency and DRX/DTX operations) is provided in the Direct Transfer.

Embodiments of the present invention have been explained.

Although cases have been described with the embodiments to define the names of the messages in detail, different names of messages may also be possible, and, the messages only need to include the information described in the present invention.

Moreover, cases have been explained with the embodiments where the control channel accompanying a data channel is for transmitting the scheduling information of the terminal from the base station and for transmitting received quality of the terminal and whether or not there is transmission data at the terminal side from the terminal. For that reason, in the control channels accompanying data channels, channel information and the frequency transmitting scheduling information, received quality of the terminal, and channel information and the frequency transmitting whether or not there is transmission data at the terminal side, are set up.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2005-379336, filed on Dec. 28, 2005, Japanese Patent Application No. 2006-100831, filed on Mar. 31, 2006, and Japanese Patent Application No. 2006-346598, filed on Dec. 22, 2006, including the specification, drawings and abstract is incorporated herein by reference in its entirety.

INDUSTRIAL APPLICABILITY

The radio communication base station apparatus and the call connection method have an advantage of reducing the call connection delay and are applicable to, for example, radio mobile communication systems.

The invention claimed is:

1. A radio communication base station apparatus comprising:
    a receiving section that receives a call establishment request from a radio communication terminal apparatus;
    a radio control section that performs a radio connection to the radio communication terminal apparatus based on the call establishment request, receives an authentication message for authenticating the radio communication terminal apparatus from an entity of a core network after performing the radio connection, and assigns a data channel to the radio communication terminal apparatus after receiving the authentication message from the entity of the core network; and
    a radio quality measurement control section that transmits to the radio communication terminal apparatus a radio quality measurement configuration message before the radio control section receives the authentication message from the entity of the core network, said radio quality measurement configuration message configuring the radio communication terminal apparatus to perform a radio quality measurement and to report the radio quality measurement to the radio communication base station apparatus for use in mobility control, wherein the radio communication base station apparatus is configured to perform handover of the radio communication terminal apparatus to another base station apparatus using the received authentication message, in case the report of the radio quality measurement received from the radio communication terminal apparatus indicates said another base station apparatus has better radio quality than the radio communication base station.

2. The radio communication base station apparatus according to claim 1, wherein the authentication message includes a security configuration.

3. The radio communication base station apparatus according to claim 1, wherein the radio quality measurement control section transmits to the radio communication terminal apparatus the radio quality measurement configuration message before the radio control section receives the authentication message from the entity of the core network and before U-plane transmission is performed.

4. The radio communication base station apparatus according to claim 1, wherein the radio quality measurement configuration message includes one or more parameters related to one or more of a measurement cell, a measurement bandwidth, and a measurement cycle for making the radio quality measurement.

5. A radio communication method performed by a base station apparatus comprising:

receiving a call establishment request from a radio communication terminal apparatus;

performing a radio connection to the radio communication terminal apparatus based on the call establishment request;

transmitting to the radio communication terminal apparatus a radio quality measurement configuration message that configures the radio communication terminal apparatus to perform a radio quality measurement for use in mobility control by the radio communication base station apparatus;

receiving an authentication message for authenticating the radio communication terminal apparatus from an entity of a core network after performing the radio connection and after transmitting the radio quality measurement configuration message;

receiving a radio quality measurement report from the radio communication terminal apparatus; and performing handover of the radio communication terminal apparatus to another base station apparatus using the received authentication message, in case the radio quality measurement report received from the radio communication terminal apparatus indicates said another base station apparatus has better radio quality than the radio communication base station; and assigning a data channel to the radio communication terminal apparatus.

6. The radio communication method according to claim 5, wherein the authentication message includes a security configuration.

7. The radio communication method according to claim 5, wherein the authentication message is received from the entity of the core network after performing the radio connection and after transmitting the radio quality measurement configuration message and before U-plane transmission is performed.

8. The radio communication method according to claim 5, wherein the radio quality measurement configuration message includes one or more parameters related to one or more of a measurement cell, a measurement bandwidth, and a measurement cycle for making the radio quality measurement.

* * * * *